(12) United States Patent
Huang et al.

(10) Patent No.: US 11,765,606 B2
(45) Date of Patent: Sep. 19, 2023

(54) METHOD FOR ROLE DECISION AND LOOP PREVENTION IN A MASTER-SLAVE ARCHITECTURE OF MESH NETWORK AND NETWORK DEVICE USING THE SAME

(71) Applicant: Arcadyan Technology Corporation, Hsinchu (TW)

(72) Inventors: Kuo-Shu Huang, Hsinchu County (TW); Tsung-Hsien Hsieh, Hsinchu (TW); Chih-Fang Lee, Hsinchu (TW)

(73) Assignee: ARCADYAN TECHNOLOGY CORPORATION, Hsinchu (TW)

( * ) Notice: Subject to any disclaimer, the term of this patent is extended or adjusted under 35 U.S.C. 154(b) by 123 days.

(21) Appl. No.: 17/037,275

(22) Filed: Sep. 29, 2020

(65) Prior Publication Data
US 2021/0153039 A1  May 20, 2021

(30) Foreign Application Priority Data

Nov. 19, 2019 (TW) ................................. 108141913

(51) Int. Cl.
*H04W 24/04* (2009.01)
*H04L 41/0654* (2022.01)
(Continued)

(52) U.S. Cl.
CPC ......... *H04W 24/04* (2013.01); *H04L 41/0654* (2013.01); *H04L 69/22* (2013.01); *H04W 84/18* (2013.01)

(58) Field of Classification Search
CPC ... H04L 12/413; H04L 41/0654; H04L 69/22; H04W 24/04; H04W 84/18
See application file for complete search history.

(56) References Cited

U.S. PATENT DOCUMENTS

| 6,603,769 | B1 * | 8/2003 | Thubert | ............... H04L 49/602 |
| | | | | 709/227 |
| 6,857,027 | B1 * | 2/2005 | Lindeborg | ............. H04L 12/46 |
| | | | | 709/224 |

(Continued)

FOREIGN PATENT DOCUMENTS

WO   WO-2020177254 A1 *  9/2020

OTHER PUBLICATIONS

Communication from European Patent Office for European Application No. 20206652.8, dated Apr. 15, 2021, 7 pages.

*Primary Examiner* — Khaled M Kassim
*Assistant Examiner* — Kai Chang
(74) *Attorney, Agent, or Firm* — Innovation Counsel LLP

(57) ABSTRACT

A network device including a main bridge, a first bridge, a controller, and an Ethernet port is provided. When the Ethernet port is connected to a mesh network, the processing unit performs the following steps: controlling the Ethernet port to transmit a first broadcast packet; when the Ethernet port receives a second broadcast packet, parsing the second broadcast packet to extract the packet path information to determine whether a path loop exists; determining, according to the Ethernet interface weight (EIW), the slave interface uplink weight (SIUW), and the master device weight (MW) carried by the first broadcast packet and the second broadcast packet, (1) whether the network device plays a master device role, (2) whether the bridge of the Ethernet port is set as the main bridge or the first bridge, and (3) whether the Ethernet port allows data transmission.

25 Claims, 22 Drawing Sheets

(51) Int. Cl.
  *H04L 69/22* (2022.01)
  *H04W 84/18* (2009.01)

(56) References Cited

U.S. PATENT DOCUMENTS

| | | | | |
|---|---|---|---|---|
| 6,922,663 | B1* | 7/2005 | Maurer | H04L 43/50 |
| | | | | 709/224 |
| 10,841,371 | B2* | 11/2020 | Abalyaev | H04W 60/00 |
| 2001/0037422 | A1* | 11/2001 | Thaler | H04L 12/40091 |
| | | | | 710/306 |
| 2007/0086361 | A1 | 4/2007 | Allan et al. | |
| 2011/0026394 | A1* | 2/2011 | Feng | H04L 41/0677 |
| | | | | 370/242 |
| 2012/0127855 | A1* | 5/2012 | Alon | H04L 45/58 |
| | | | | 370/218 |
| 2016/0149799 | A1* | 5/2016 | Yu | H04L 45/48 |
| | | | | 370/392 |
| 2017/0118041 | A1* | 4/2017 | Bhattacharya | H04L 49/65 |
| 2018/0270140 | A1* | 9/2018 | Taniguchi | H04L 12/4625 |
| 2020/0412598 | A1* | 12/2020 | Rao | H04L 47/24 |

\* cited by examiner

METHOD FOR ROLE DECISION AND LOOP PREVENTION IN A MASTER-SLAVE ARCHITECTURE OF MESH NETWORK AND NETWORK DEVICE USING THE SAME

This application claims the benefit of Taiwan application Serial No. 108141913, filed Nov. 19, 2019, the subject matter of which is incorporated herein by reference.

BACKGROUND OF THE INVENTION

Field of the Invention

The invention relates in general to a network device and a control method using the same, and more particularly to a network device adaptable to a mesh network, and a control method using the same.

Description of the Related Art

The mesh network is a wireless network architecture that has been widely used. The mesh network is provided with the features of self-configuration and self-organization. In a mesh network, the nodes can be freely connected, and the network topology of the mesh network can be dynamically adjusted according to the type of connection between the nodes.

However, if the nodes of the mesh network are connected in an arbitrary manner, a path loop may be formed. When the path loop exists, the packets will circulate in the looping path and generate a broadcast packet storm. Therefore, it has become a prominent task for the industries to provide an effective solution.

SUMMARY OF THE INVENTION

The invention is directed to a network device selectively set as one of a master device role and a slave device role. If the network device is set as the master device role, the network device responds a network address requesting broadcast packet originated from another network device. If the network device is set as the slave device role, the network device transmits the network address requesting broadcast packet to another network device. The network device includes a main bridge, a first bridge, a processing unit, and an Ethernet transmission interface. The first bridge is different from the main bridge. The Ethernet interface is provided with a first Ethernet port whose bridge is selectively set as one of the main bridge and the first bridge. The processing unit is coupled to the Ethernet interface to perform the following steps in response to the first Ethernet port being connected to a mesh network: setting the bridge of the first Ethernet port as the first bridge, and setting the first network device as the master device role; controlling the first Ethernet port to transmit a first broadcast packet carrying a first Ethernet interface weight (EIW); if a second broadcast packet is received within a predetermined period, parsing the second broadcast packet to extract the packet path information to determine whether a path loop exists; if it is determined that the path loop exists, determining, according to the first EIW and a second EIW carried by the second broadcast packet, whether the bridge of the first Ethernet port is set as the first bridge and whether the first Ethernet port is set to a blocking state.

According to one embodiment of the present invention, if no broadcast packet is received within the predetermined period, the network device is set as the master device role, the bridge of the first Ethernet port is set as the main bridge, and the first Ethernet port is set to a forwarding state.

According to one embodiment of the present invention, if the parsing of the packet path information determines that no path loop exists, and the second network device is not set as the master device role, the bridge of the first Ethernet port is set as the main bridge, the first Ethernet port is set to the forwarding state, and a broadcast packet response is transmitted in response to the second broadcast packet.

According to one embodiment of the present invention, the first broadcast packet further contains a first master weight (MW), and the second broadcast packet further contains a second MW. If the parsing of the packet path information determines that no path loop exists, and the second network device is currently set as the master device role, whether the first network device needs to be set as the master device is determined according to the first MW and the second MW.

According to a first aspect of the present invention, a first network device selectively set as one of a master device role and a slave device role is disclosed. If the first network device is set as the master device role, the first network device responds to a network address requesting broadcast packet originated from another network device. If the first network device is set as the slave device role, the first network device transmits the network address requesting broadcast packet to the other network device. The first network device includes a main bridge, a first bridge, a processing unit, and an Ethernet transmission interface. The first bridge is different from the main bridge. The Ethernet interface is provided with a first Ethernet port whose bridge is selectively set as one of the main bridge and the first bridge. The processing unit is coupled to the Ethernet interface to perform the following steps in response to the first Ethernet port being connected to a mesh network: setting the bridge of the first Ethernet port as the first bridge, and setting the first network device as the master device role; controlling the first Ethernet port to transmit a first broadcast packet carrying a first MW; if a second broadcast packet is received within a predetermined period, determining, according to the first MW and a second MW carried by the second broadcast packet, whether the first network device needs to be set as the master device.

According to another embodiment of the present invention, if the first MW is larger than the second MW, the first network device is set as the main access point network device, the bridge of the first Ethernet port is set as the main bridge, and a broadcast packet response is transmitted in response to the second broadcast packet.

According to another embodiment of the present invention, if the first MW is smaller than the second MW, and the first network device is not allowed to be set as the slave device role, the first network device is set as the master device, the bridge of the first Ethernet port is set as the first bridge, and the first Ethernet port is set to the blocking state.

According to another embodiment of the present invention, if the first MW is smaller than the second MW, and the first network device is allowed to be set as the slave device role, the first network device is set as the slave device, the bridge of the first Ethernet port is set as the first bridge, and the first Ethernet port is set as a potential uplink path (potential UPth).

According to another embodiment of the present invention, the packet path information contains a source address (SA) and a neighbor address (NA). If the source address and the received address (RA) both belong to the same network device, such as the first network device, it is determined that the path loop exists.

According to another embodiment of the present invention, the first EIW is related to at least one of (a) a user setting, (b) the media access control (MAC) address of the first Ethernet port, (c) the MAC address of the first network device, (d) the name of the first Ethernet port.

According to another embodiment of the present invention, the first MW is related to at least one of (a) a user setting, (b) whether the first Ethernet port is capable of linking up to the Internet, (c) transmission speed to the Internet from the first Ethernet port, (d) the MAC address of the first Ethernet port.

According to a second aspect of the present invention, a first network device selectively set as one of a master device role and a slave device role is disclosed. If the first network device is set as the master device role, the first network device responds a broadcast packet. If the first network device is set as the slave device role, the first network device transmits the broadcast packet. The first network device includes a main bridge, a first bridge, a processing unit, and an Ethernet transmission interface. The first bridge is different from the main bridge. The Ethernet interface is provided with a first Ethernet port whose bridge is selectively set as one of the main bridge and the first bridge. The processing unit is coupled to the Ethernet transmission interface. If the first network device is set as the slave device role, and the bridge of the first Ethernet port is set as the first bridge. The processing unit performs the following steps: controlling the first Ethernet port to transmit a first broadcast packet in response to a predetermined scenario that the first Ethernet port is connected to a mesh network, or the first Ethernet port is just set as a standby uplink path; if a first predetermined period matures but a second broadcast packet is not received, and a second predetermined period matures but a first broadcast packet response responding to the first broadcast packet is not received, setting the bridge of the first Ethernet port as the main bridge and re-transmitting the first broadcast packet.

According to an alternate embodiment of the present invention, the first broadcast packet carries a first Ethernet interface weight. If a second broadcast packet is received within a first predetermined period, the second broadcast packet is parsed to extract the packet path information to determine whether a path loop exists. If it is determined that the path loop exists, whether the bridge of the first Ethernet port is set as the first bridge and whether the first Ethernet port is set to the blocking state is determined according to the first EIW and a second EIW carried by the second broadcast packet.

According to an alternate embodiment of the present invention, if a second broadcast packet is received within the first predetermined period, but the first network device does not have any other uplink path, the bridge of the first Ethernet port is set as the main bridge, and the first Ethernet port is set to the forwarding state.

According to an alternate embodiment of the present invention, the first broadcast packet carries a slave interface uplink weight (SIUW). If the second broadcast packet is received within the first predetermined period, and the first network device is provided with a second uplink path through a second Ethernet port, whether the first Ethernet port is set to the blocking state is determined according to the first SIUW and a second SIUW carried by the second broadcast packet. The first SIUW is related to at least one of (a) a user setting, (b) network transmission speed from the first Ethernet port to a master device, (c) transmission speed of the network media connected to the first Ethernet port.

According to an alternate embodiment of the present invention, if the first SIUW is smaller than the second slave device uplink weight, the first Ethernet port is set to the blocking state, and a standby uplink path (Standby UPth).

According to an alternate embodiment of the present invention, if the first SIUW is larger than the second slave device uplink weight, firstly the second Ethernet port is set to the blocking state, then the bridge of the first Ethernet port is set as the main bridge, and lastly the first Ethernet port is set to a forwarding state.

According to an alternate embodiment of the present invention, the first network device further is provided with a wireless network port, which is activated by the first network device after the first network device is connected to an external master device.

The above and other aspects of the invention will become better understood with regard to the following relevant descriptions of the preferred but non-limiting embodiment(s). The following description is made with reference to the accompanying drawings.

DETAILED DESCRIPTION OF THE INVENTION

The present invention discloses a master-slave architecture method for role decision and loop prevention. The master-slave architecture method relates to a management technology of local network topology. At the initial establishment stage of a local network, the master-slave architecture method manages the network devices of the entire local network by: selecting one network device among several network devices as a master device role and using the maintaining network devices as slave devices; and preventing the occurrence of path looping. Here, the network devices can be realized by bridges. That is, one of several bridges is selected as a master bridge, and the maintaining bridges are used as slave bridges, and the network link between the bridges prevents the occurrence of path looping.

Figure 1:
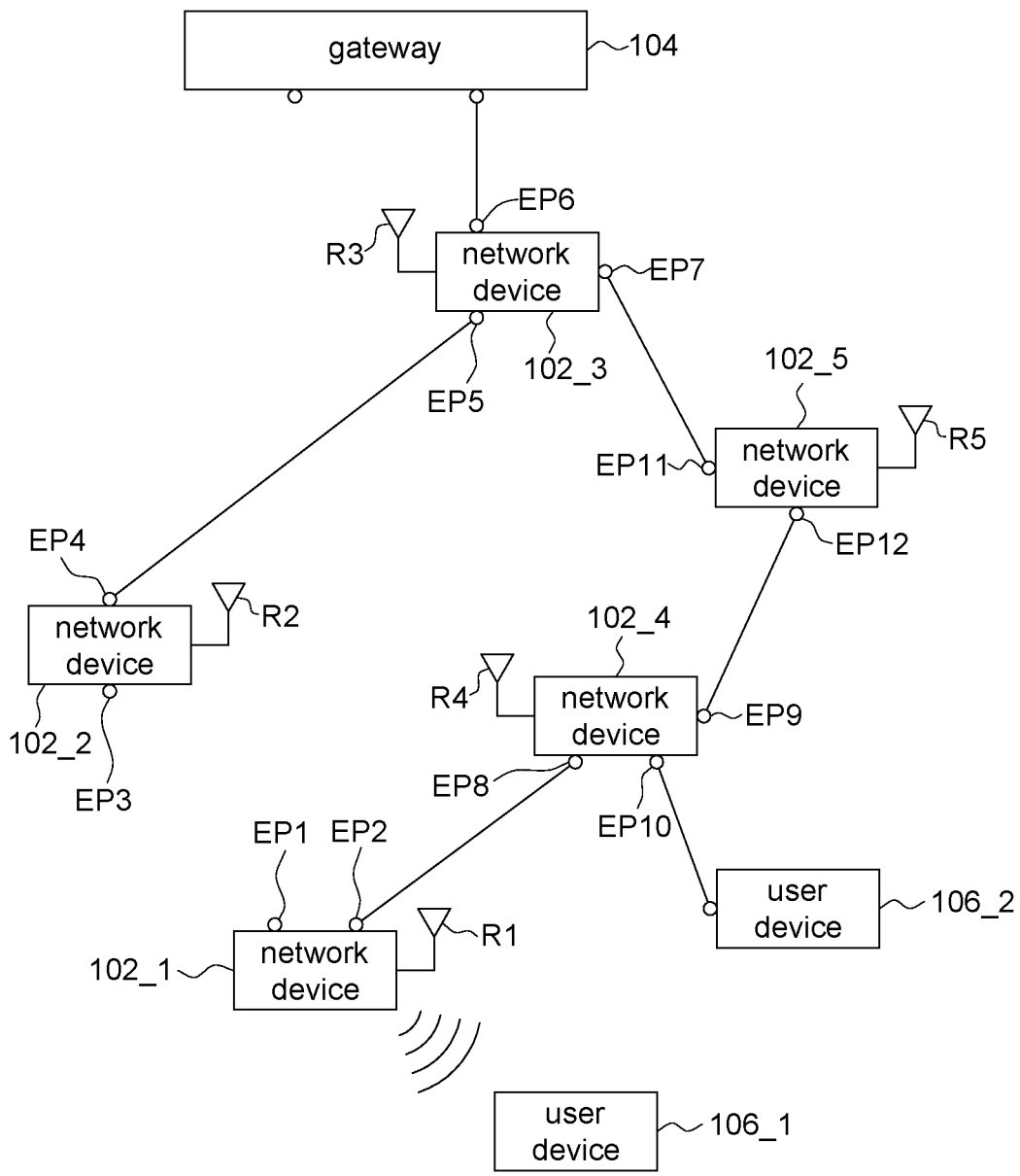
FIG. 1 is a schematic diagram of an example of a mesh network.

Referring to FIG. 1, a schematic diagram of an example of a mesh network 100 is shown. The mesh network 100 includes five network devices 102_1 to 1025, a gateway 104 and two user devices 106_1 and 106_2. The network devices 102_1 to 102_5 can be realized by bridges. Different network devices 102_1 to 102_5 can be connected in a wired and/or wireless manner to receive and transmit data streams. The network devices 102_1 to 102_5 can further be operated in an access point (AP) mode and used as an AP device to provide Wi-Fi service to a user device (such as the user device 1061). The user devices 106_1 and 106_2 can be realized by set-top boxes, PCs, TVs or other terminal devices.

Although five network devices, one gateway and two user devices are illustrated in FIG. 1 as an example, the quantity and connection method of the devices exemplified in FIG. 1 are not for limiting the present invention. Generally speaking, the quantity and connection method of the devices are not subjected to specific restrictions.

In the example of FIG. 1, each of the network devices 102_1 to 102_5 respectively includes a wired Ethernet interface and a wireless Wi-Fi interface, wherein the Ethernet port of each of the network devices 102_1 to 102_5 includes at least an Ethernet port. As indicated in FIG. 1, the network device 102_1 includes two Ethernet ports EP1 and EP2 and a Wi-Fi interface R1; the network device 102_2 includes two Ethernet ports EP3 and EP4 and a Wi-Fi interface R2; similarly, each of the other network devices 102_3 to 102_5 is provided with 2 to 3 Ethernet ports EPx and at least one Wi-Fi interface Rx.

The gateway 104 can provide gateway service to the network devices 102_1 to 102_5, such as Internet access service or the service for connecting to another wired/wireless network.

Figure 2:
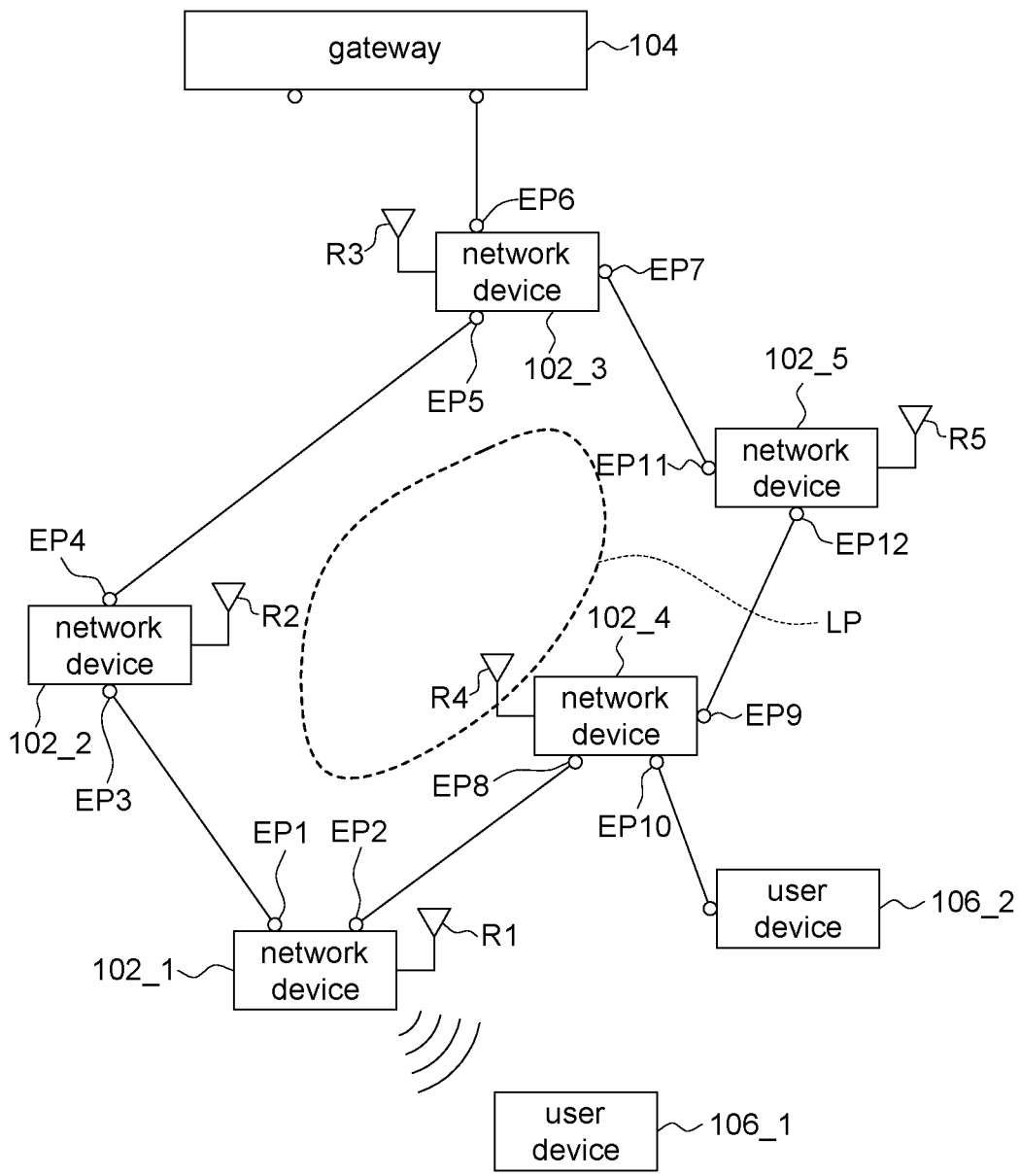
FIG. 2 is a schematic diagram of forming a path loop in a mesh network.

Meanwhile, if the connection of the node ports is not suitably defined or updated, path looping could occur to the mesh network 100. As indicated in FIG. 2, if the downlink Ethernet port EP3 of the network device 102_2 changes to be connected to the Ethernet port EP1 of the network device 102_1, a path loop LP will be formed. Under such circumstance, the packets will be circulated within the path loop LP, and a broadcast packet storm could easily occur. Therefore, it is essential to avoid the formation of path loop LP.

Firstly, the technical terms used in the present invention and their abbreviations are listed below, and the meaning of each technical term is explained in the following paragraphs.

| | |
|---|---|
| EI | Ethernet Interface |
| EP | Ethernet Port |
| MAC | Media Access Control Address |
| BP | Broadcast Packet |
| BPR | Broadcast Packet Response |
| MB | Main Bridge |
| SB | Spilt Bridge, Standby Bridge |
| SA | Source Address |
| NA | Neighbor Address |
| DPth | Downlink Path |
| UPth | Uplink Path |
| EIW | Ethernet Interface Weight |
| SIUW | Slave interface Uplink Weight |
| MW | Master Weight |
| MASTER | Master Device |
| Slave | Slave Device |
| DISABLED | Disabled State |
| LEARNING | Learning State |
| LEARNING_SD | Learning - slave downlink |
| FORWARDING | Forwarding State |
| BLOCKING | Blocking State |

Relevant descriptions of the uplink path (UPth) and the downlink path (DPth) are disclosed below. If the Ethernet port of a network device can be directly or indirectly connected to the gateway 104, such Ethernet port is categorized as an uplink port. Conversely, if the Ethernet port of a network device cannot be directly or indirectly connected to the gateway 104, such Ethernet port is categorized as a downlink port. For example, the Ethernet port EP1 of the network device 102_1 can be connected to the gateway 104 through the network device 1022, and therefore can be defined as an uplink port. On the other hand, since the Ethernet port EP10 of the network device 102_4 is directly connected to the user device 106_2 and cannot be connected to the gateway 104, the Ethernet port EP10 is defined as a downlink port.

Relevant descriptions of the main bridge mode (MB) and the split bridge mode (SB) are disclosed below. The network device 200 of the present invention is provided with at least two operation modes: (1) the MB mode, and (2) the SB mode.

Figure 3A:
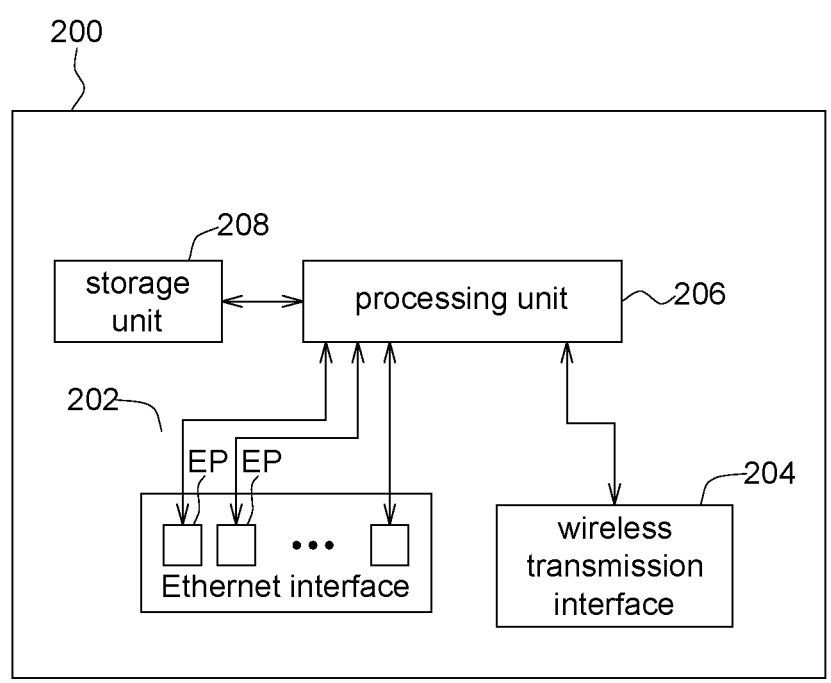
FIG. 3A is a block diagram of a network device according to an embodiment of the present invention.

Referring to FIG. 3A, a block diagram of a network device 200 according to an embodiment of the present invention is shown. The network device 200 can be realized by any off the network devices 102_1 to 102_5 of FIGS. 1A to 1C. FIG. 3A is a block diagram of bridges. The network device 200 includes an Ethernet interface 202, a wireless interface 204, a processing unit 206, and a storage unit 208. The Ethernet interface 202 includes one or more Ethernet ports EP, wherein each of the Ethernet ports EP can be physically connected to an Ethernet cable and used as an Ethernet connection of the network device 200. The wireless interface 204 can be realized by a Wi-Fi interface. The processing unit 206 is electrically connected to the Ethernet interface 202, the wireless interface 204 and the storage unit to process the message transmitted from the Ethernet interface 202 and the wireless interface 204 and to execute the control method of a network device of the present invention. The storage unit 208 includes, for example, a memory for storing instructions, data and programming codes that can be executed or processed by the processing unit 206.

Figure 3B:
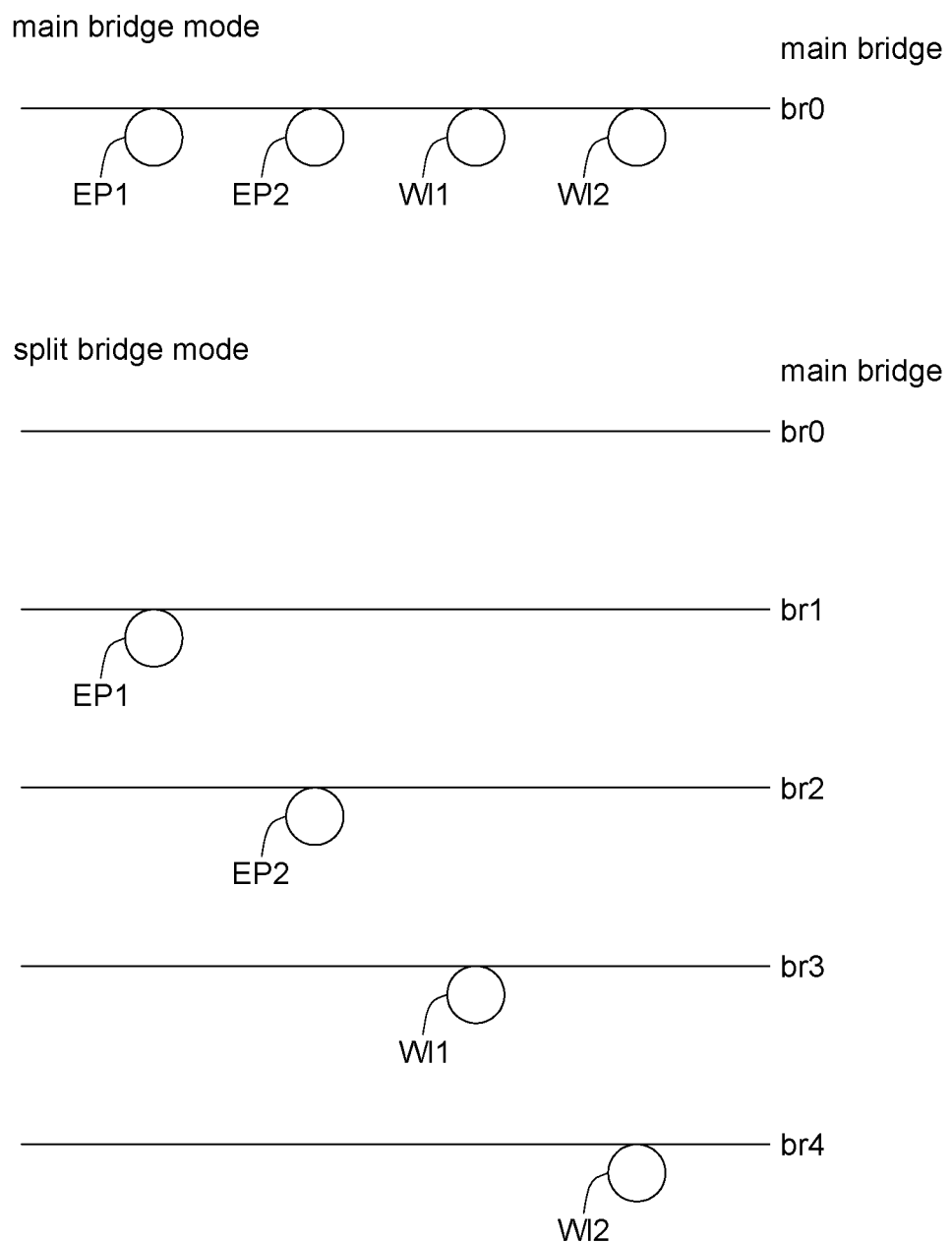
FIG. 3B is a schematic diagram of the main bridge mode of a conventional network device and the split bridge mode of a network device according to an embodiment of the present invention.

As indicated in FIG. 3B, when the network device 200 is set to the main bridge mode, all bridges of the Ethernet ports EP1 to EP2 and the wireless ports WL1 to WL2 of the network device 200 are main bridges br0. Therefore, when the Ethernet port EP1 receives a broadcast packet BR, the Ethernet port EP1 will automatically transfer the broadcast packet BR to the other three ports including EP2, and WL1 to WL2.

As indicated in FIG. 3B, when the network device 200 is set to the split bridge mode SB, each of the Ethernet ports EP1 to EP2 200 and the wireless port WL1 to WL2 of the network device independently uses an individual bridge. The bridge of the Ethernet port EP1 is the first bridge br1; the bridge of the Ethernet port EP2 is the second bridge br2; the bridge of the wireless port WL1 is the third bridge br3; and the bridge of the wireless port WL2 is the fourth bridge br4. When the Ethernet port EP1 receives a broadcast packet BR, given that the ports are isolated from each other, the Ethernet port EP1 will automatically transfer the broadcast packet BR to the other three ports including EP2 and WL1 to WL2, which then freely transfer the broadcast packet forwards. Besides, the network device 200 can selectively configure some of the bridges of the ports as the main bridge br0. For example, the bridge of the Ethernet port EP1 is the main bridge br0, but the bridges of the Ethernet port EP2 and the wireless ports WL1 to WL2 respectively are the second bridge br2, the third bridge br3, and the fourth bridge br4.

Moreover, when the network device is set to the split bridge mode SB, each port of the network device independently uses an individual bridge, and is assigned with an individual port identification code. For example, if each of the ports has an individual MAC address, the MAC addresses can directly be used as a port identification code. If the ports and the network device share the same MAC address, the port identification code can be a combination of the MAC address (such as 00-05-5D-E8-0F-A3) plus the port name (such as br01), and the obtained port identification code can be: 00-05-5D-E8-0F-A3-br01.

Relevant descriptions of the broadcast packet (BP) and the broadcast packet response (BPR) are disclosed below. The broadcast packet (BP) used in the master-slave architecture method for role decision and loop prevention of the present invention is a network address requesting broadcast packet operated in the level 3 network layer of the Internet protocol. Exemplarily but not restrictively, the broadcast packet is a DHCP packet. Basically, the slave device 200 needs to be capable of transmitting a network address requesting broadcast packet to other network device, and the master device 200 needs to be capable of responding the network address requesting broadcast packet originated from other network device. If the packet needs to be compatible with the products using conventional technology, the DHCP packet is preferred.

Relevant descriptions of the master device (MASTER) and the slave device (Slave) are disclosed below. Within the local network range of FIG. 1, the role each network device plays can be confirmed by two methods below. (1) The user manually sets a constant role, for example, the network device 102_5 can only play the slave device role, and the network device 102_3 can only play the master device role. (2) Through the exchange of packet information between the network devices, the network device capable of responding the network address requesting broadcast packet originated from other network device is set as the only master device within the local network range, and the other network devices are set as slave devices. Thus, each slave device is capable of transmitting the network address requesting broadcast packet to other network devices and receiving corresponding network address of each slave device from the master device through management agreement. Let FIG. 1 be taken for example. The network device 102_3 is a master device, and the network device 102_5 is a slave device. Based on the concept of downlink path, the Ethernet port EP7 of the network device 102_3 is a downlink path of the master device, and the Ethernet port EP6 is an uplink path of the master device; the Ethernet port EP12 of the network device 102_5 is a downlink path of the slave device, and the Ethernet port EP11 is an uplink path of the slave device.

According to the control method of the present invention, when the local network has any topology change, the network device whose port is newly connected to the network or whose classification originally is provided with backup uplink path will firstly check whether the local network has any other master device. If no other master device exists, the network device will set itself as a new master device of the local network. Conversely, if the local network already has a master device, then a comparison based on the weight information between two network devices is made to determine which device is the master device. Thus, under the dynamic management mechanism of the master device, other network device can share the networking work to achieve loading balance, and provide standby function or even provide handover function between different network devices.

Any local network can have only one master device, but can have several slave devices Slave. When a network device is newly connected to the network, the network device will transmit a broadcast packet to explore the entire network topology and check whether its role is the master device role. After the network device confirms that its role is the master device role, the network device being the master device will respond a broadcast packet response BPR to the broadcast packet BP transmitted from other slave devices.

When a slave device Slave detects several potential uplink paths (such as several Ethernets or wireless WI-FI transmission paths), the slave device Slave will compare the slave interface uplink weight (SIUW) carried by different broadcast packets and will select one uplink path as the only uplink path, and the unselected uplink paths will be used as standby uplink paths. On the other hand, the user can set the SIUW value for a particular port and make the particular port carry a larger weight to become the uplink path.

Figure 9:
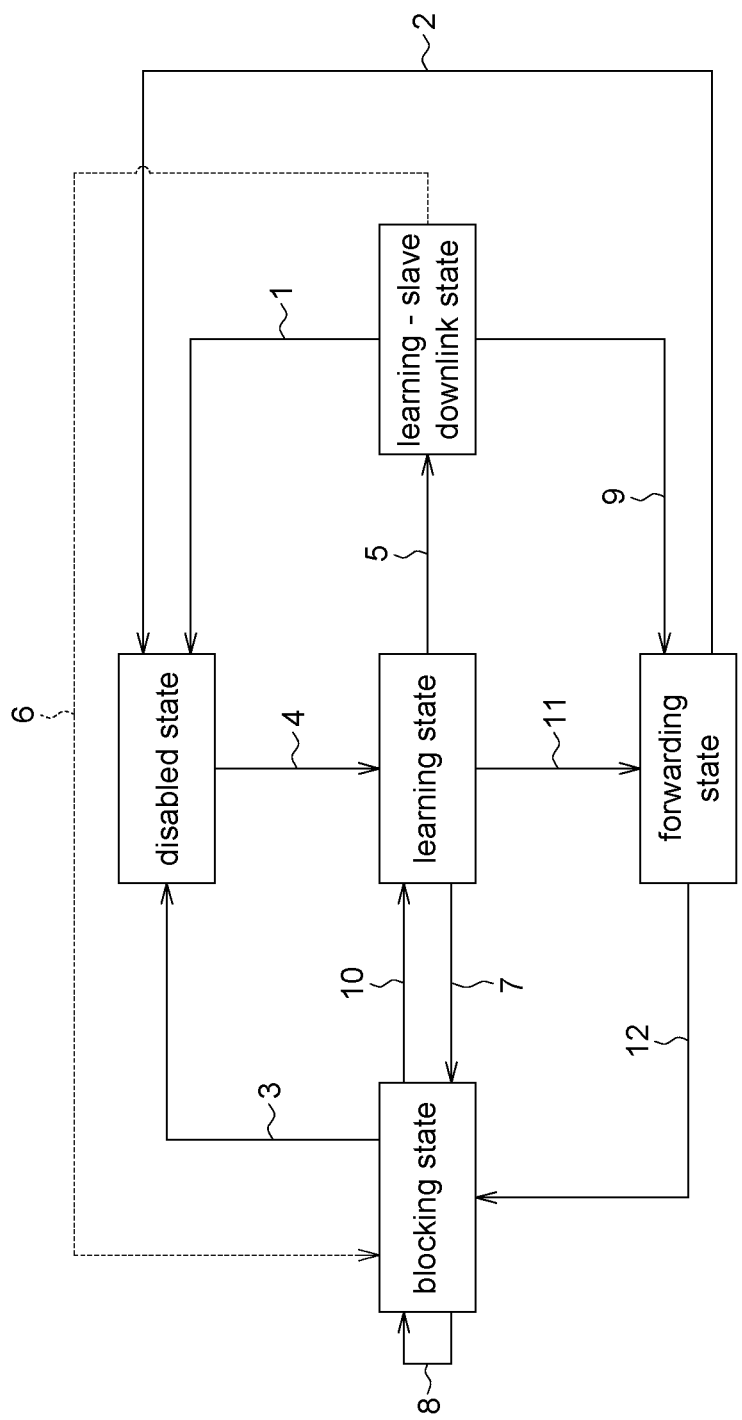
FIG. 9 is a schematic diagram of the conversion of Ethernet port states in a control method of a network device according to the present invention.

Relevant descriptions of port states are disclosed below. As indicated in FIG. 9, the Ethernet port of the present invention can be set to five states, and relevant conversion conditions and paths are illustrated in FIG. 9. The five states of Ethernet port are disclosed below. (1) The disabled state (DISABLED): the port is not linked down, and is set to the split bridge mode SB (that is, the bridge of the port is not br0). (2) The learning state (LEARNING): the broadcast packet BP is periodically transmitted (such as every 1 or 2 seconds), and the port is set to the split bridge mode SB (that is, the bridge of the port is not br0). (3) The learning-slave downlink state (LEARNING_SD): the broadcast packet BP is periodically transmitted, and the bridge of the port is set as the main bridge br0. (4) The forwarding state (FORWARDING): the port operates normally and transfers the received user data packet, and the bridge of the port is set as the main bridge br0. (5) The blocking state (BLOCKING): the port stops transmitting the user data packet, and is set to the split bridge mode SB (that is, the bridge of the port is not br0).

Relevant descriptions of weight are disclosed below. According to the control method of the present invention, when the network device role or the path crashes, which port needs to enter a blocking state, or which path is selected as the uplink path is determined according to three types of weights including (1) the Ethernet interface weight (EIW), (2) the slave interface uplink weight (SIUW), and (3) the master weight (MW). (1) The Ethernet interface weight (EIW) is calculated according to possible relevant parameters including (a) user setting, (b) MAC address of the port, (c) network device MAC address, and (d) port name. (2) The slave interface uplink weight (SIUW) is calculated according to possible relevant parameters including (a) user setting, (b) speed to master, (c) speed of media, and (d) other collected information of the learning state; and the user can set the priority of the uplink path according to the SIUW to obtain a better uplink path, which provides better network experience. (3) The master weight (MW) is calculated according to possible relevant parameters including (a) user setting, (b) capability of Internet, (c) speed to Internet, (d) MAC address of the port.

FIGS. 4 to 8 illustrate the flowcharts of the control method of the present invention. When a network device is newly connected to the network or an original network device breaks down and causes the connection topology of the mesh network to change, the network device executing the control method of the present invention will transmit a broadcast packet BP in the level 3 network layer of the TCP/IP Internet protocol, such as but is not limited to the DHCP broadcast packet BP, to explore whether the network has usable paths, and to add additional information (such as the above three weights: EIW, MW, and SIUW) to the broadcast packet BP to determine the master role and the slave role, prevent path loop, and dynamically select the uplink path.

Figure 4:
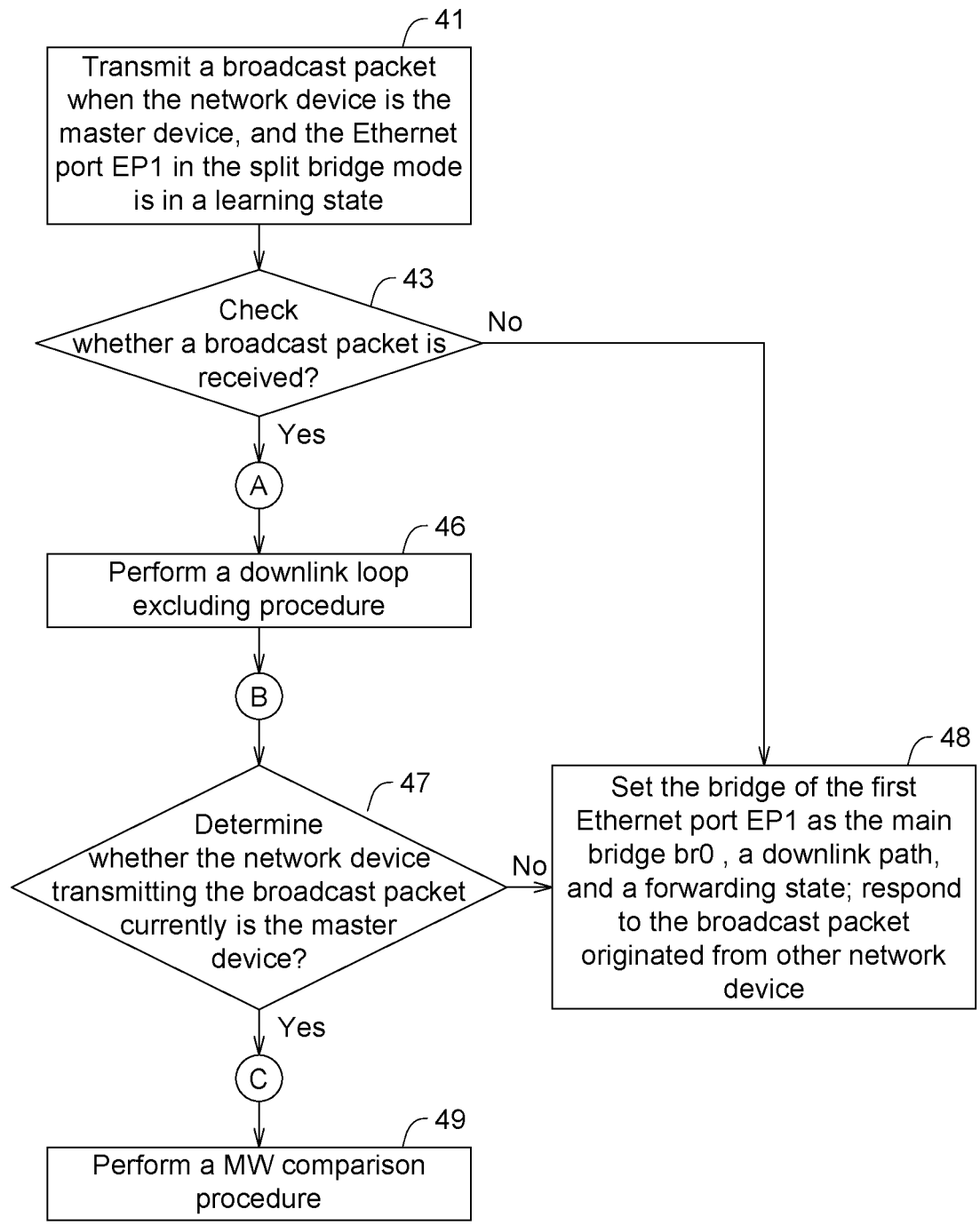
FIG. 4 is a flowchart of a role decision procedure of a control method of a network device according to the present invention.
Figure 5:
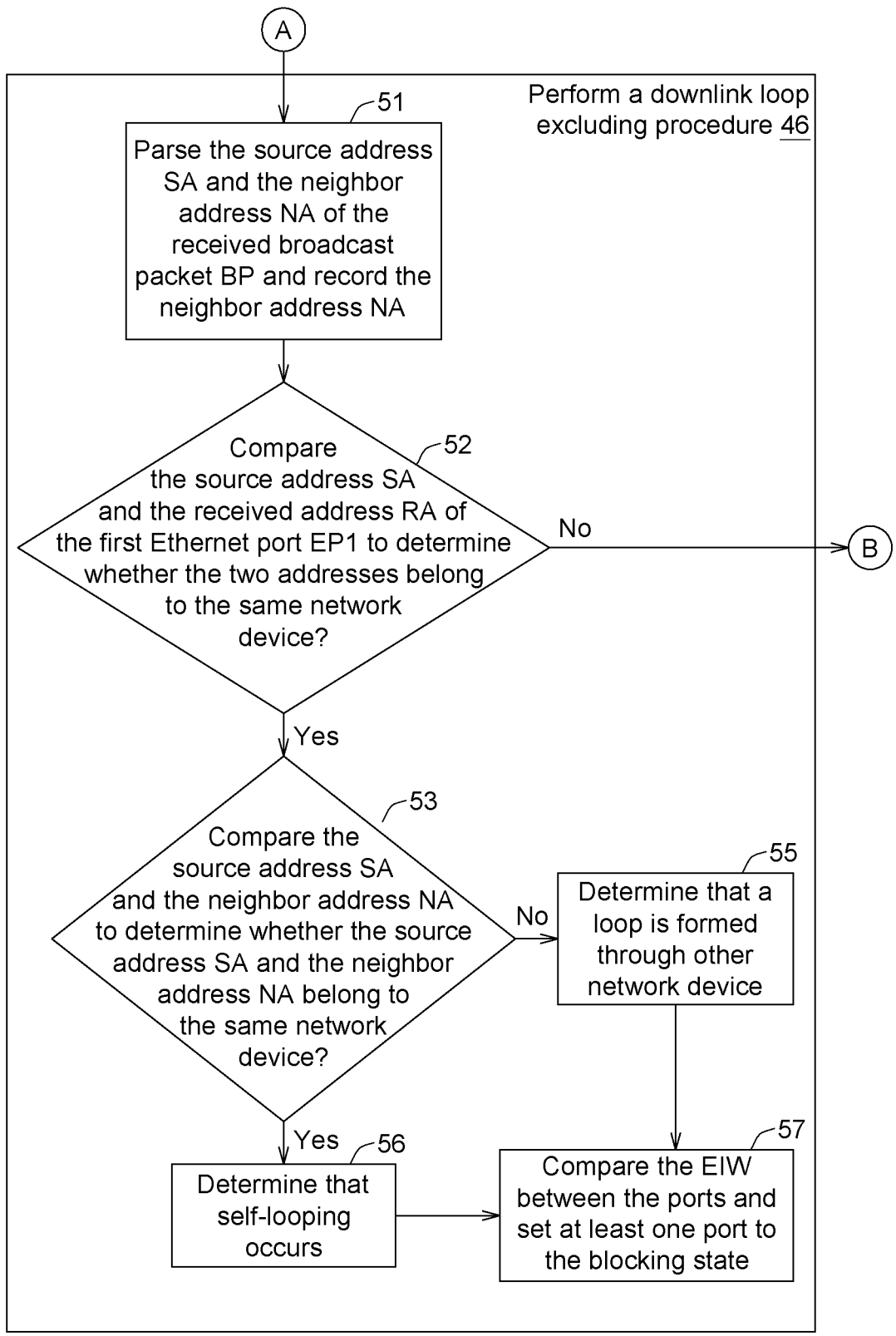
FIG. 5 is a flowchart of a downlink loop excluding procedure of a control method of a network device according to the present invention.
Figure 6:
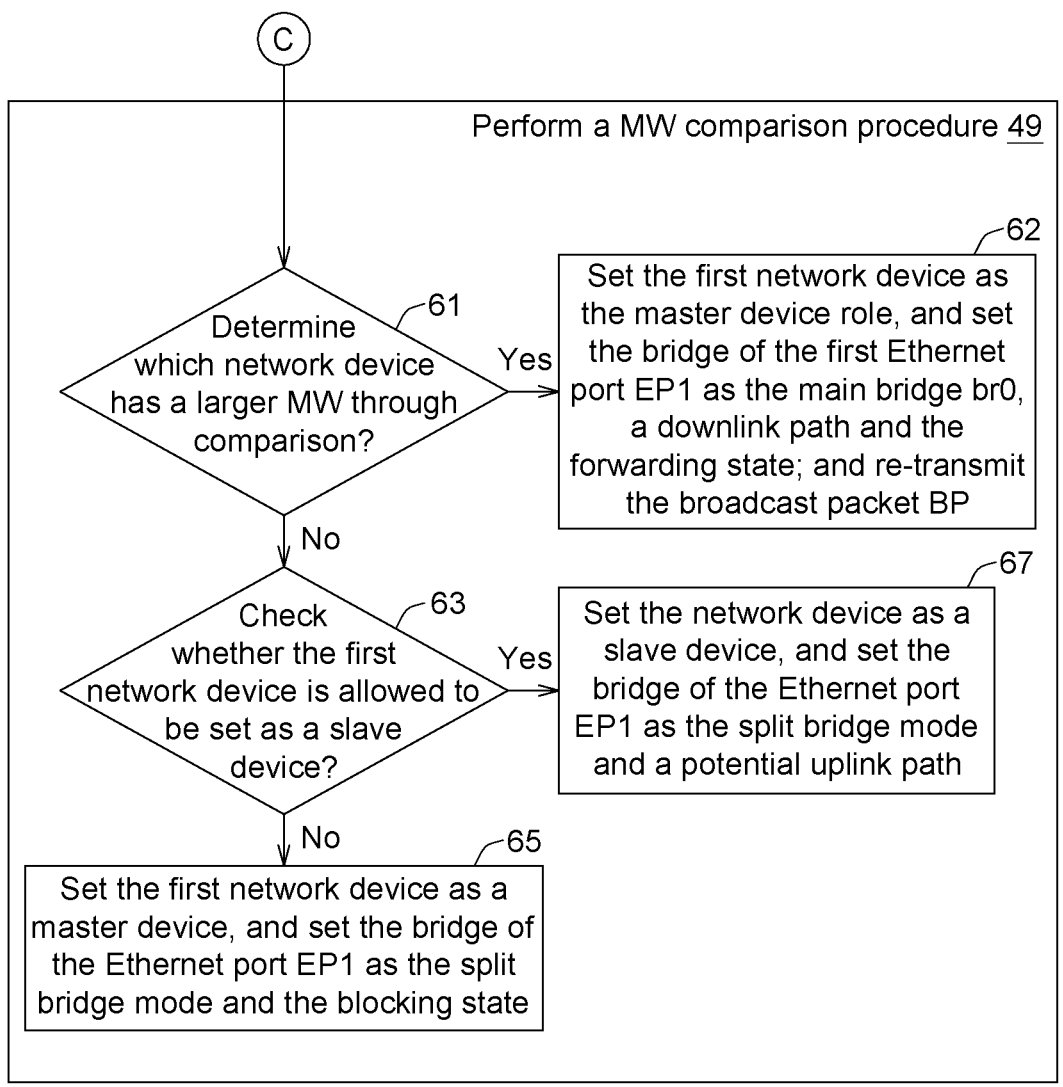
FIG. 6 is a flowchart of an MW comparison procedure of a control method of a network device according to the present invention.

As indicated in FIGS. 4 to 6, the role decision procedure of the control method of the present invention is performed to determine, among the several network devices, which is the master device Master, and which are the slave devices Slave. FIG. 4 is a flowchart showing the main steps of the role decision procedure.

Step 41: when the first Ethernet port EP1 is connected to the mesh network, if the first network device of the first Ethernet port EP1 is set as the master device, the first Ethernet port EP1 is set to a split bridge mode, the bridge of the Ethernet port EP1 is set as the first bridge br1 and is in a learning state, then the first broadcast packet BP #1 carrying a first EIW in the level 3 network layer of the Internet protocol is transmitted to the mesh network.

Step 43: whether a broadcast packet BP is received by the first Ethernet port EP1 within a predetermined period (Time Out) is checked. If no broadcast packet BP is received within the predetermined period, the method proceeds to step 48. If a broadcast packet BP, such as the second broadcast packet BP #2, is received within the predetermined period, then the method proceeds to step 46 to perform a downlink loop excluding procedure.

Step 46: when a second broadcast packet is received within the predetermined period, the present step being a downlink loop excluding procedure is performed. Details of the present step are disclosed with reference to FIG. 5. In the present step, whether the network link connected to the first Ethernet port EP1 forms a downlink loop and whether the first Ethernet port EP1 needs to enter the blocking state to interrupt the downlink loop is determined.

Step 47: if it is determined according to the downlink loop excluding procedure of step 46 that the first Ethernet port EP1 does not need to enter the blocking state, this implies that the received broadcast packet BR is not originated from the first network device to which the first Ethernet port EP1 belongs, and it can be confirmed that the received broadcast packet is the second broadcast packet BR #2 originated from a second network device. Therefore, whether the second network device transmitting the second broadcast packet BR #2 currently is the master device is determined. If it is determined that the second network device to which the second Ethernet port EP2 belongs is not the master device, the method proceeds to step 48. If it is determined that the second network device currently is another master device, the method proceeds to step 49 to perform the MW comparison procedure.

Step 48: if no broadcast packet is received within the predetermined period of step 43 or the second network device of step 47 is not set as the master device role, then the first network device is set as the master device role, the bridge of the first Ethernet port EP1 is set as the main bridge br0, a downlink path, and a forwarding state; a broadcast packet response can be transmitted to respond to the broadcast packet originated from other network device.

Step 49: the present step is a MW comparison procedure. Details of the present step are disclosed with reference to FIG. 6. In the present step, a comparison between the MW of the first network device to which the first Ethernet port EP1 belongs and the MW of the second network device to which the second Ethernet port EP2 belongs is made to determine which network device is the master device, and which network device is the slave device.

Referring to FIG. 5, a flowchart of the downlink loop excluding procedure of step 46 is shown. In the present step, the packet path information of the second broadcast packet is parsed to determine whether the network link connected to the first Ethernet port EP1 forms a downlink loop or not. If it is determined the downlink loop exists, whether the bridge of the first Ethernet port is set as the first bridge and whether the first Ethernet port is set to the blocking state is determined according to the first EIW and the second EIW carried by the second broadcast packet to interrupt the downlink loop:

Step 51: the two addresses carried by the received second broadcast packet BP #2 (that is, the source address (SA) and the neighbor address (NA)) as well as the received address (RA) (that is, the address of the first Ethernet port EP) are parsed. The neighbor address indicates the address of the last port on the transmission path through which the broadcast packet enters the packet target address.

Step 52: a comparison between the source address SA carried by the second broadcast packet BP #2 and the received address RA of the first Ethernet port EP1 is made to determine whether the network device to which the source address SA belongs and the network device to which the received address RA of the first Ethernet port EP1 belongs have the same MAC address, that is, whether the source address SA and the received address RA belong to the first network device. If yes, the method proceeds to step 53 to determine whether the source address SA and the neighbor address NA belong to the same network device. If yes, it is determined that a downlink loop is formed. If no, the method proceeds to node B to perform step 47.

Step 53: under the circumstance that both the source address SA and the received address RA belong to the same first network device, a comparison between the source address SA and the neighbor address NA is made to determine whether the source address SA and the neighbor address NA belong to the same network device. If the source address SA and the neighbor address NA belong to the same network device, it is determined that the first Ethernet port EP1 and the second Ethernet port EP2 at the two ends of network link both belong to the same network device, and self-looping occurs. That is, if the source address SA and the neighbor address NA belong to the same network device, it is determined that a downlink self-loop is formed, and the method proceeds to step 56. If the source address SA and the neighbor address NA do not belong to the same network device, it is determined that a downlink loop is formed through a second network device, and the method proceeds to step 55.

Step 56: self-looping is explained with reference to FIG. 10A, wherein the first Ethernet port EP1 and the second Ethernet port EP2 belong to the same network device, and after the two ports are connected via a network link, the two ports transmit broadcast packets BR #1 and BR #2 to each other. In step 53, when the network device to which the source address SA belongs and the network device to which the neighbor address NA belongs are found to have the same MAC address, it is determined that self-looping occurs, and the method proceeds to step 57.

Step 55: the downlink loop formed through the second network device is explained with reference to FIGS. 11A to B and FIGS. 12A to B, wherein the first Ethernet port EP1 and the second Ethernet port EP2 belong to the first network device, the third port EP3 and the fourth port EP4 belong to the second network device, after the four ports are connected via two network links, a loop is formed, and the four ports transmit broadcast packets to each other. In step 53, when the network device to which the source address SA belongs and the network device to which the received address RA belongs have the same MAC address, but the network device to which the source address SA belongs and the network device to which the neighbor address NA belongs have different MAC addresses, it is determined that a loop is formed through a second network device, and the method proceeds to step 57.

Step 57: a comparison the Ethernet interface weight EIW between the ports is made, and at least one port is set to the blocking state. As disclosed above, the Ethernet interface weight EIW is calculated according to possible relevant parameters including (a) user setting, (b) MAC address of the port, (c) MAC address of the network device, (d) port name. In the embodiment of FIG. 10 to 12, the weight is determined according to (b) MAC address of the port, and the port with the highest MAC address is set as the port to be blocked (the port that needs to be set to the blocking state). Thus, in the embodiment of FIG. 10B, since the second Ethernet port EP2 has the highest MAC address, the first Ethernet port EP1 is set to a learning-slave downlink state, and the second Ethernet port EP2 is set to the blocking state. In FIG. 11C, since the second network device is a conventional network device without the split bridge mode and the control method of the present invention cannot be executed on the ports of the second network device, the second Ethernet port EP2 has the highest MAC address, the first Ethernet port EP1 is set to the learning-slave downlink state, and the second Ethernet port EP2 is set to the blocking state. In FIG. 12C, since the control method of the present invention can be executed on the second network device, the network device has the split bridge mode. Thus, it is determined that the fourth port EP4 of the second network device has the highest MAC address, the first to the third ports EP1 to EP3 are set as the learning-slave downlink state, and the fourth port EP4 is set to the blocking state. As indicated in FIGS. 10 to 12, through the step 57 of setting the port with the highest MAC address to the blocking state, the downlink loop which would otherwise occur can therefore be avoided.

Referring to FIG. 6, a flowchart of the MW comparison procedure of step 49 is shown. The first broadcast packet BP #1 carries the first MW, and the second broadcast packet BP #2 carries the second MW. After it is detected that the second network device is currently set as the master device role, whether the first network device needs to be set as the master device is determined according to the first MW and the second MW.

Refer to FIG. 4. In the present embodiment, the downlink loop excluding procedure of step 46 is performed prior to the MW comparison procedure of step 49. However, in practice, the downlink loop excluding procedure of step 46 can be omitted, and step 49 can be performed immediately after steps 43 and 47. That is, the first Ethernet port EP1 transmits a first broadcast packet BP #1 carrying the first MW. When the second broadcast packet BP #2 is received within a predetermined period, if it is detected that the second network device transmitting the second broadcast packet BP #2 is currently set as the master device role, then whether the first network device needs to be set as the master device role or whether the first Ethernet port EP1 needs to be set to a blocking state is determined according to the first MW and the second MW carried by the second broadcast packet.

Step 61: a comparison between the first master weight MW #1 of the first Ethernet port EP1 and the second master weight MW #2 of the second Ethernet port EP2 is made. If the first master weight MW #1 is larger than the second master weight MW #2, then the method proceeds to step 62; otherwise, the method proceeds to step 63. As disclosed above, the master weight MW is calculated according to possible relevant parameters including (a) user setting, (b) capability of Internet, (c) speed to Internet, (d) MAC address of the port. Suppose the master weight MW is determined according to (d) MAC address of the port only. If the first Ethernet port EP1 has a higher MAC address, the method proceeds to step 62; if the first Ethernet port EP1 has a lower MAC address, the method proceeds to step 63.

Step 62: if the first MW is larger than the second MW, then the first network device to which the first Ethernet port EP1 belongs is set as the master device role, and the bridge of the first Ethernet port EP1 is set as the main bridge br0, a downlink path and the forwarding state; and the first broadcast packet BP #1 is re-transmitted. Suppose the second network device of FIG. 15A has a lower MAC address, that is, the second master weight MW #2 is smaller than the first master weight MW #1. After steps 61 and 62 are performed, the first network device is set as the master device.

Step 63: if the first Ethernet port EP1 of the first master weight MW #1 is smaller than the second master weight MW #2 of the second Ethernet port EP2, whether the first network device to which the first Ethernet port EP1 belongs is enforced as a constant master device Master by the user is checked. If such enforcement exists, this implies that the user does not allow the first network device to be set as a slave device, and the method proceeds to step 65. If the said enforcement does not exist, the method proceeds to step 67.

Figure 15A:
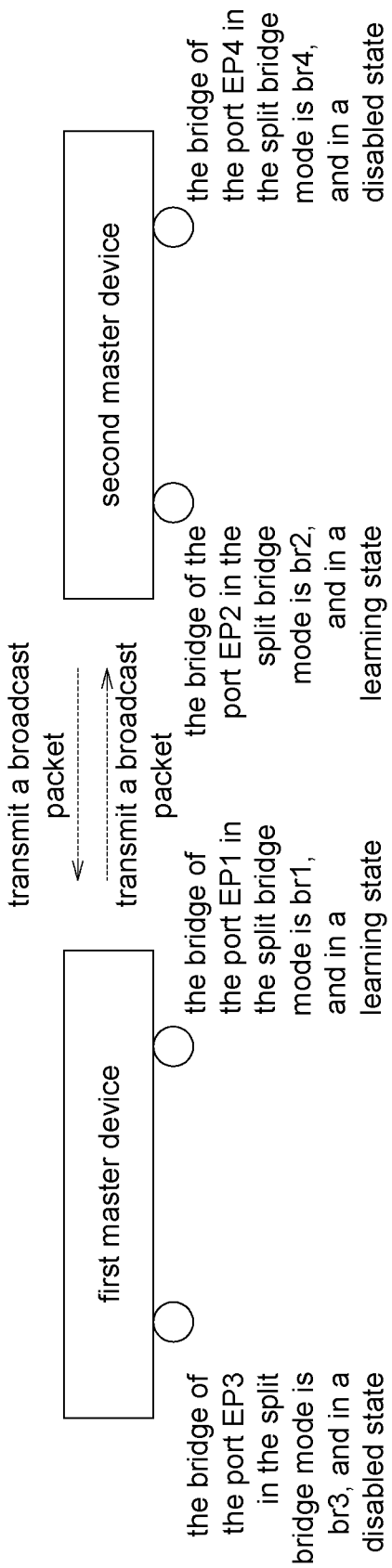
FIGS. 15A to 15C are schematic diagrams of potential MW comparison scenarios of a network device.

Step 65: under the circumstance that the first master weight MW #1 of the first Ethernet port EP1 is smaller than the second master weight MW #2 of the second Ethernet port EP2, if the first network device is forced as the master device role by the user, then the first Ethernet port EP1 is set to the split bridge mode and the blocking state to separate two master devices. As indicated in FIG. 15A, if the second master weight MW #2 of the second network device is larger than the first master weight MW #1 of the first network device and the user does not allow the first network device to be set as a slave device, then the result as indicated in FIG. 15C will be obtained after steps 63 and 65 are performed. As indicated in FIG. 15C, the Ethernet port EP1 of the first network device is set to the split bridge mode, the bridge of the Ethernet port EP1 is set as the first bridge br1 and the blocking state, the Ethernet port EP2 corresponding to the second network device is set to the main bridge mode, the bridge of the Ethernet port EP2 is set as the main bridge br0 and the forwarding state. Thus, at the end, the first network device and the second network device are still the only master device in two different local networks, respectively.

Figure 15B:
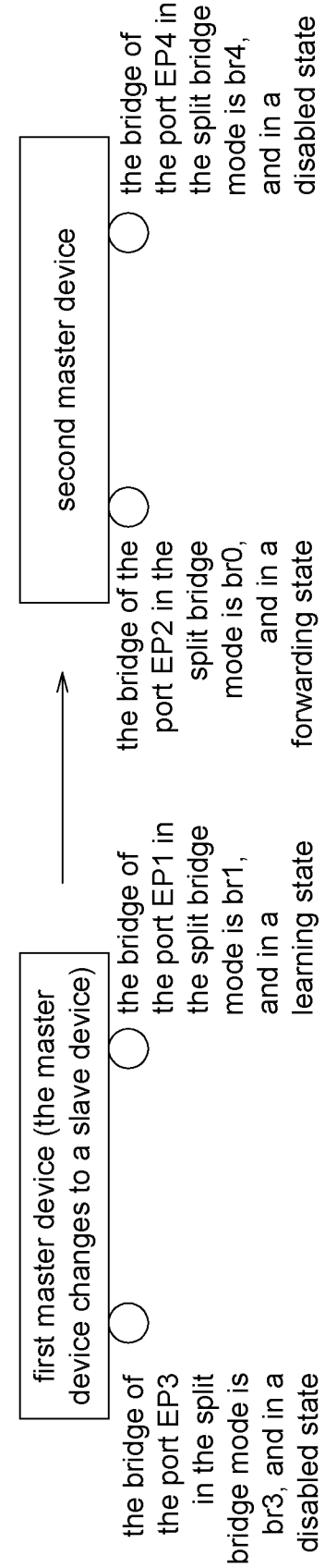
Figure 15C:
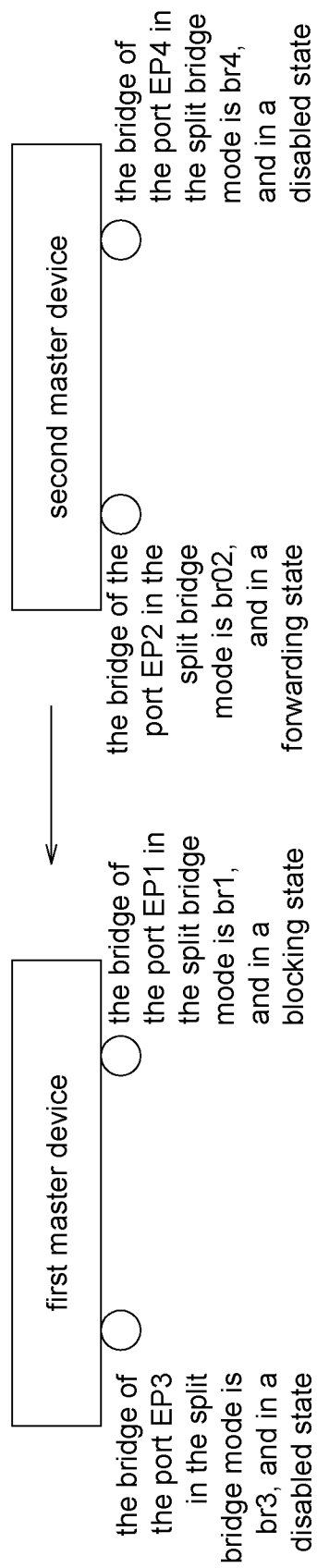

Step 67: under the circumstance that the first master weight MW #1 of the first Ethernet port EP1 is smaller than the second master weight MW #2 of the second Ethernet port EP2, if the first network device to which the first Ethernet port EP1 belongs is allowed to be set as the slave device role, then the result as indicated in FIG. 15B will be obtained after steps 63 and 67 are performed. As indicated in FIG. 15B, the Ethernet port EP1 of the first network device is set as the split bridge mode, and the bridge of the Ethernet port EP1 is set as the first bridge br1, the learning state, and a potential uplink path (potential UPth). The Ethernet port EP2 corresponding to the second network device is set as the main bridge mode, and the bridge of the Ethernet port EP2 is set as the main bridge br0 of the second network device and the forwarding state.

Figure 7:
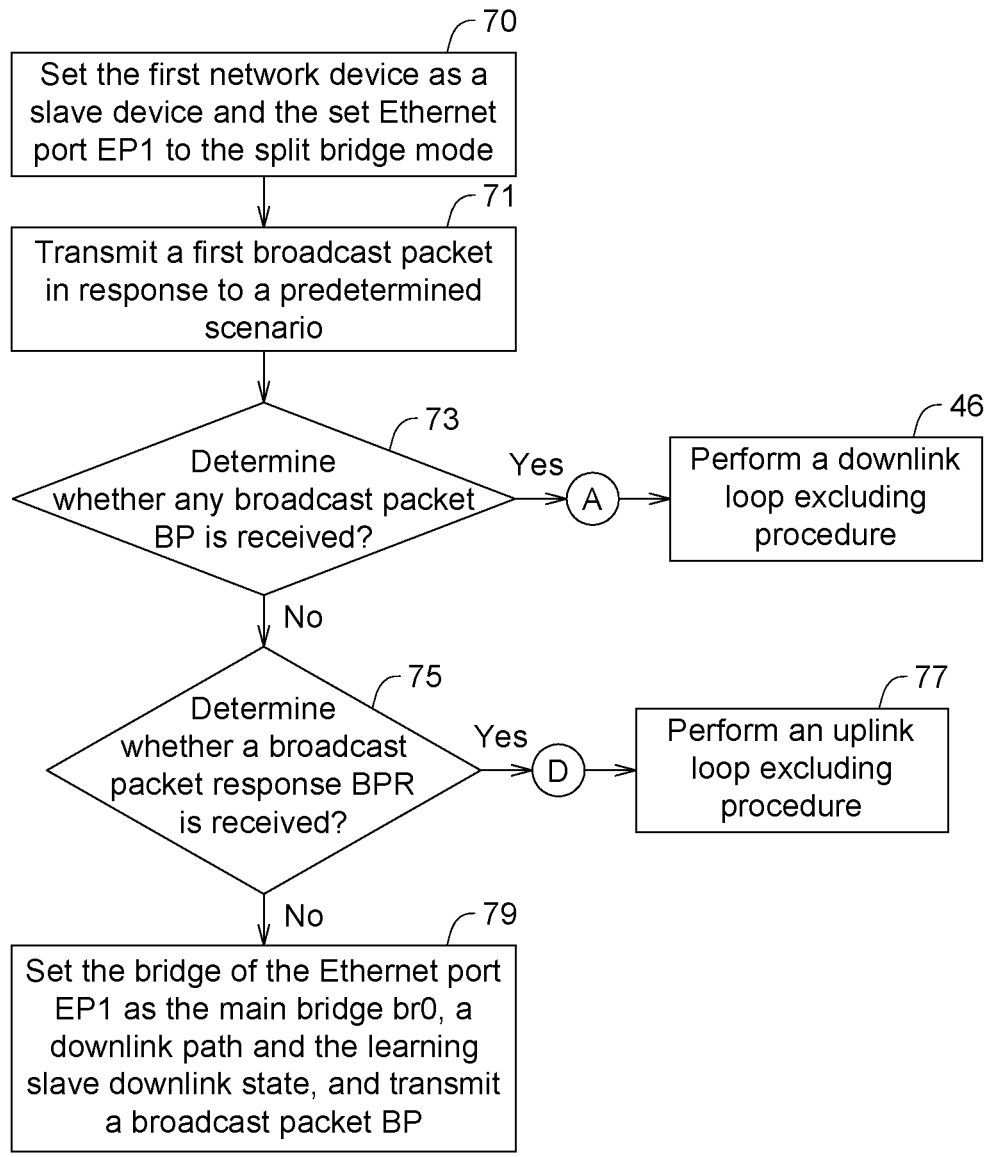
FIG. 7 is a flowchart of a slave behavior of a control method of a network device according to the present invention.
Figure 8:
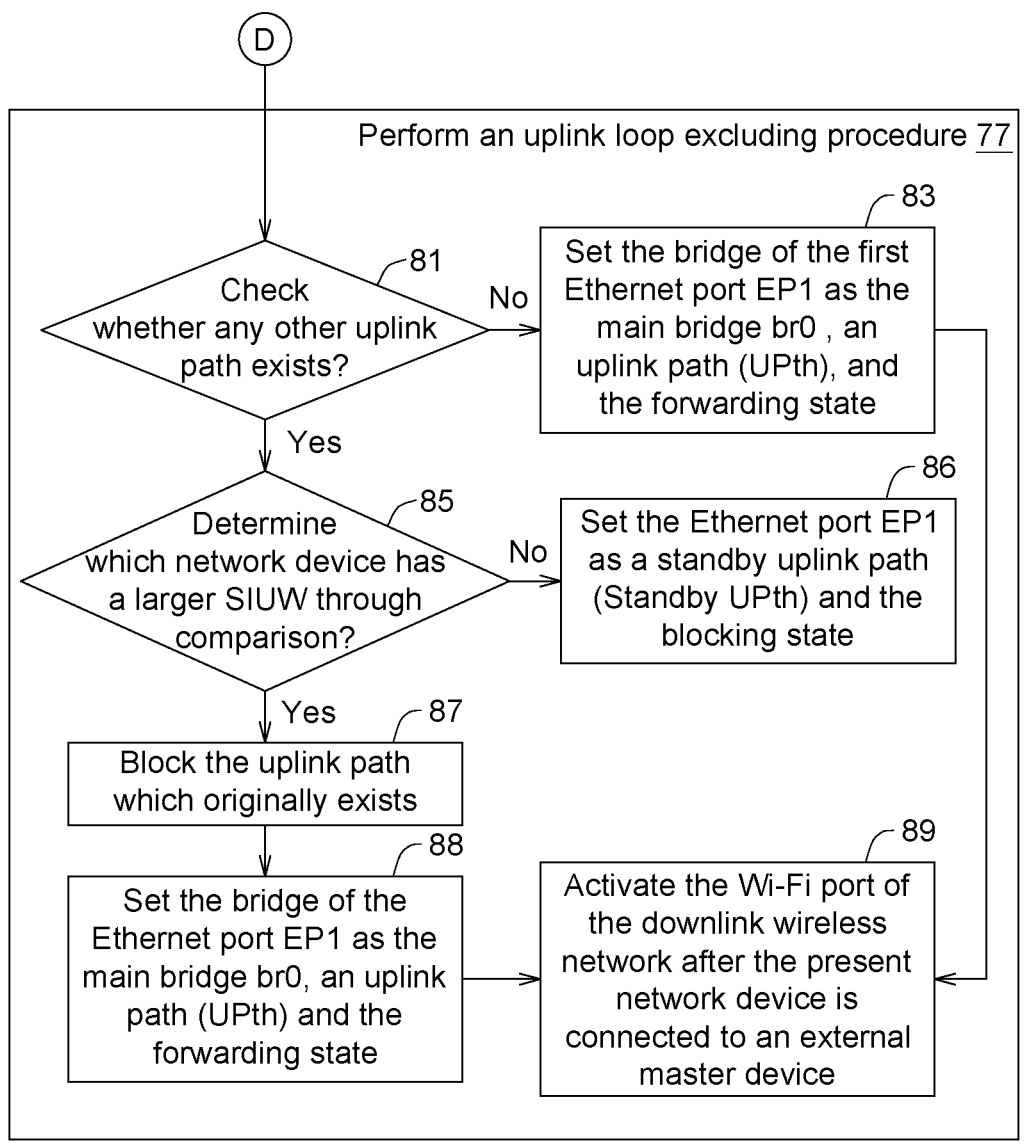
FIG. 8 is a flowchart of an uplink loop excluding procedure of a control method of a network device according to the present invention.

FIGS. 7 to 8 illustrate the flowcharts of a slave behavior and an uplink loop excluding procedure of the control method of the present invention. The said procedure avoids the network device forming an uplink path loop, selects an uplink path among the several usable uplink paths of the network device as the current uplink path of the network device, and sets the maintaining uplink paths as standby uplink paths (Standby UPth). Referring to FIG. 7, a flowchart of the main steps of a slave behavior of a control method of a network device is shown.

Step 70: the first network device to which the first Ethernet port EP1 belongs is set as a slave device, and the first Ethernet port EP1 is set to the split bridge mode.

Step 71: in response to a predetermined scenario, a first broadcast packet BP #1 is transmitted by the first Ethernet port EP. The scenario that may trigger the first Ethernet port EP1 to perform step 71 includes: (1) the network link to which the first Ethernet port EP1 is just connected to a mesh network, (2) step 67 is performed, and the first Ethernet port EP1 is just set as a potential uplink path (potential UPth); (3) step 86 is performed, and the first Ethernet port EP1 is just set as a standby uplink path (standby UPth).

Step 73: whether any broadcast packet, such as the second broadcast packet BP #2, is received within the first predetermined period is determined. If no broadcast packet is received within the first predetermined period, the method proceeds to step 75. If a broadcast packet is received within the first predetermined period, the method performs the downlink loop excluding procedure of step 46, but does not perform the MW comparison procedure of step 49. That is, the second broadcast packet is parsed to extract the packet path information to determine whether a path loop exists. If it is determined that the path loop exists, whether the bridge of the first Ethernet port is set as the first bridge br1 and whether the first Ethernet port EP1 needs to be set to a blocking state is determined according to the first EIW carried by the first broadcast packet BP #1 and the second EIW carried by the second broadcast packet BP #2.

Step 75: whether the first broadcast packet response BPR responding to the first broadcast packet BP #1 is received within a second predetermined period is determined. If the first broadcast packet response BPR is not received within the second predetermined period, the method proceeds to step 79; if the first broadcast packet response BPR is received within the second predetermined period, the method performs the uplink loop excluding procedure of step 77. Details of step 77 are explained with reference to FIG. 8.

Step 77: the present step is an uplink loop excluding procedure whose details are explained with reference to FIG. 8. In the present step, whether the network link to which the first Ethernet port EP1 is connected forms an uplink loop, and whether the first Ethernet port EP1 needs to be set to a blocking to interrupt the uplink loop is detected.

Step 79: if the first predetermined period matures but no broadcast packet is received, and the second predetermined period matures but the first broadcast packet response responding to the first broadcast packet is received, the bridge of the first Ethernet port EP1 is set as the main bridge br0, the downlink path and the learning-slave downlink state, and periodically transmits the first broadcast packet BP #1.

Referring to FIG. 8, a flowchart of the main steps of the uplink loop excluding procedure of step 77 is shown.

Step 81: whether the first network device to which the first Ethernet port EP1 belongs currently has any other uplink path is checked. If the first network device does not have any other uplink path, the method proceeds to step 83; if the first network device has other uplink path, the method proceeds to step 85.

Step 83: when the first predetermined period matures but no broadcast packet is received and the first broadcast packet response is received within the second predetermined period, if the first network device does not have any other uplink path, the bridge of the first Ethernet port EP1 is set as the main bridge br0, the uplink path (UPth), and the forwarding state.

Step 85: when the first predetermined period matures but the second broadcast packet is not received, the first broadcast packet response is received within the second predetermined period, if the first network device has other uplink path through other Ethernet port, then a comparison between the slave interface uplink weight (SIUW), the first slave interface uplink weight SIUW #1 of the first Ethernet port EP1, and the second slave interface uplink weight SIUW #2 of the second Ethernet port EP2 is made. If the first slave interface uplink weight SIUW #1 is larger than the second slave interface uplink weight SIUW #2, then the method performs step 87. If the first slave interface uplink weight SIUW #1 is smaller than the second slave interface uplink weight SIUW #2, then the method performs step 86. As disclosed above, the slave interface uplink weight SIUW is calculated according to possible relevant parameters including (a) user setting, (b) speed to master, (c) speed of media, (d) other collected information of the learning state. Suppose the slave interface uplink weight SIUW is determined according to (d) MAC address of the port only. If the first Ethernet port EP1 has a higher MAC address, then the method proceeds to step 87; if the first Ethernet port EP1 has a lower MAC address, then the method proceeds to step 86.

Step 86: if the first SIUW is smaller than the second slave device uplink weight, then the first Ethernet port EP1 is set as a standby uplink path (Standby UPth) and the blocking state.

Step 87: if the first SIUW is larger than the second slave device uplink weight, then the uplink path which originally can be connected to the gateway 104 through other port is blocked. For example, the second Ethernet port EP2 is set to the blocking state.

Step 88: the bridge of the first Ethernet port EP1 is set as the main bridge br0, an uplink path (UPth) and the forwarding state.

Step 89: after the first network device and the master device are connected successfully, a Wi-Fi interface of the downlink wireless network of the first network device can be selectively (but not necessarily) activated.

Referring to FIG. 9, a schematic diagram of the conversion of Ethernet port states in a control method of a network device according to the present invention is shown. Relevant conditions for the conversion of states are disclosed below.

The condition for the Ethernet port to enter the disabled state condition from one of three states, including the learning-slave downlink state (path 1), the forwarding state (path 2), the blocking state (path 3), is: the Ethernet port is linked down.

The condition for the Ethernet port to enter the learning state (path 4) from the disabled state is: the Ethernet port is linked up.

The condition for the Ethernet port to enter the learning-slave downlink state (path 5) from the learning state is: the Ethernet port still does not receive any broadcast packet response (BPR) after the learning state has continued for a predetermined detection period (time out).

The condition for the Ethernet port to enter the blocking state (path 6) from the learning-slave downlink state, to enter the blocking state (path 7) from the learning state, and to maintain at the blocking state (path 8) is: the Ethernet port receives a broadcast packet originated from itself, that is, a self-looping broadcast packet (self BP) is detected, and the comparison shows that the self-looping broadcast packet has a lower Ethernet interface weight (EIW).

The condition for the Ethernet port to enter the forwarding state (path 9) from the learning-slave downlink state is: the Ethernet port receives a broadcast packet response (BPR), and the comparison shows that the received broadcast packet response carries a larger slave interface uplink weight (SIUW).

The condition for the Ethernet port to enter the learning state (path 10) from the blocking state is: the Ethernet port does not receive any broadcast packet response (BPR) after the blocking state has continued for a predetermined detection period (time out).

The condition for the Ethernet port to enter the forwarding state (path 11) from the learning state is: (1) for the master device: the Ethernet port does not receive any broadcast packet response (BPR) after the learning state has continued for a predetermined detection period (time out), or the Ethernet port receives other broadcast packet with lower MW, and maintains as the current master device role; (2) for the slave device: the Ethernet port receives a broadcast packet response (BPR), and the comparison shows that the Ethernet port carries a larger Ethernet interface weight (EIW).

The condition for the Ethernet port to enter the blocking state (path 12) from the forwarding state is: (1) for the master device: the Ethernet port receives a broadcast packet (BP), and the comparison shows that the received broadcast packet carries a larger master device weight (MW); (2) for slave device: the Ethernet port receives a broadcast packet response (BPR), and the comparison shows that the received broadcast packet response carries a larger slave interface uplink weight (SIUW).

FIGS. 10 to 15 illustrate how the control method of the present invention prevents self-looping by setting particular port to the blocking state.

Figure 10A:
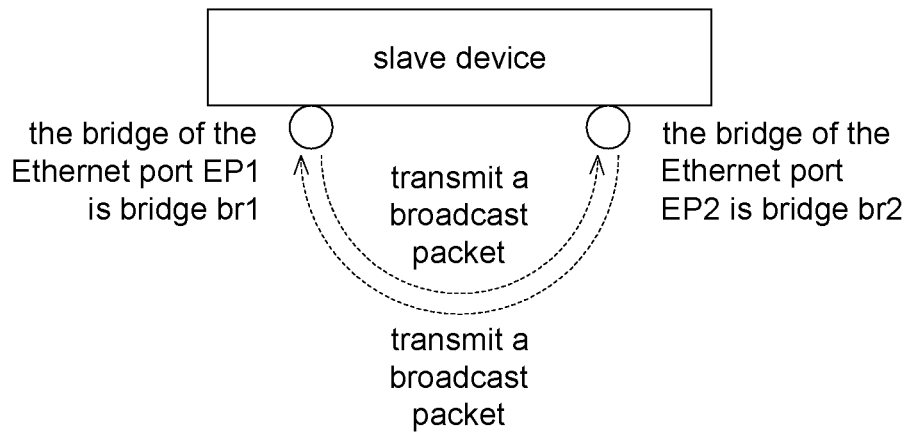
FIGS. 10A to 10B are schematic diagrams of scenario 1 of potential downlink loops of a network device.
Figure 10B:
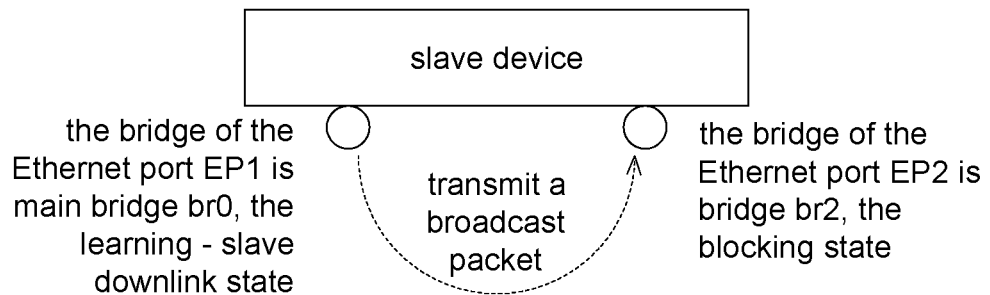
Figure 11A:
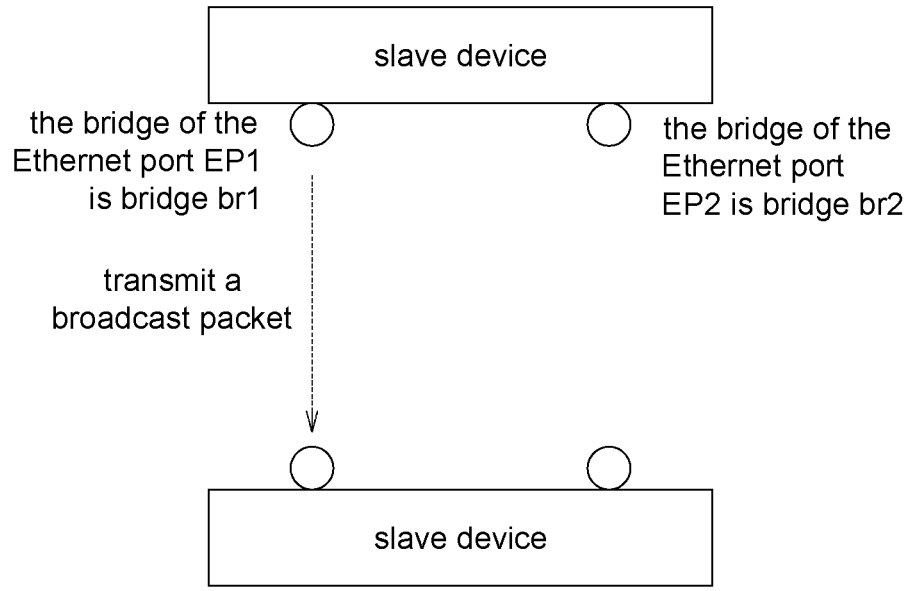
FIGS. 11A to 11C are schematic diagrams of scenario 2 of potential downlink loops of a network device.
Figure 11B:
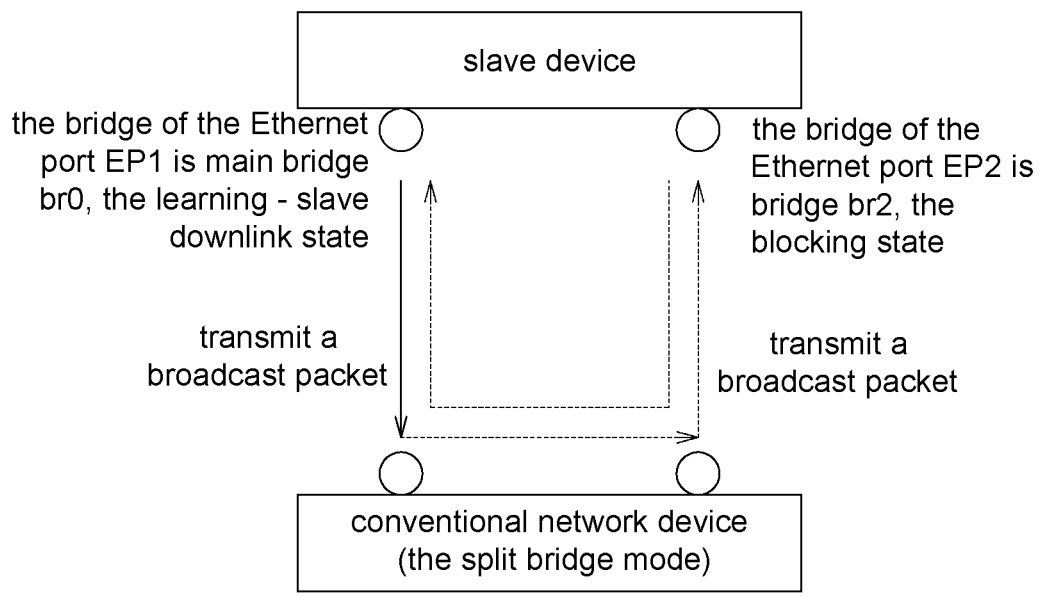
Figure 11C:
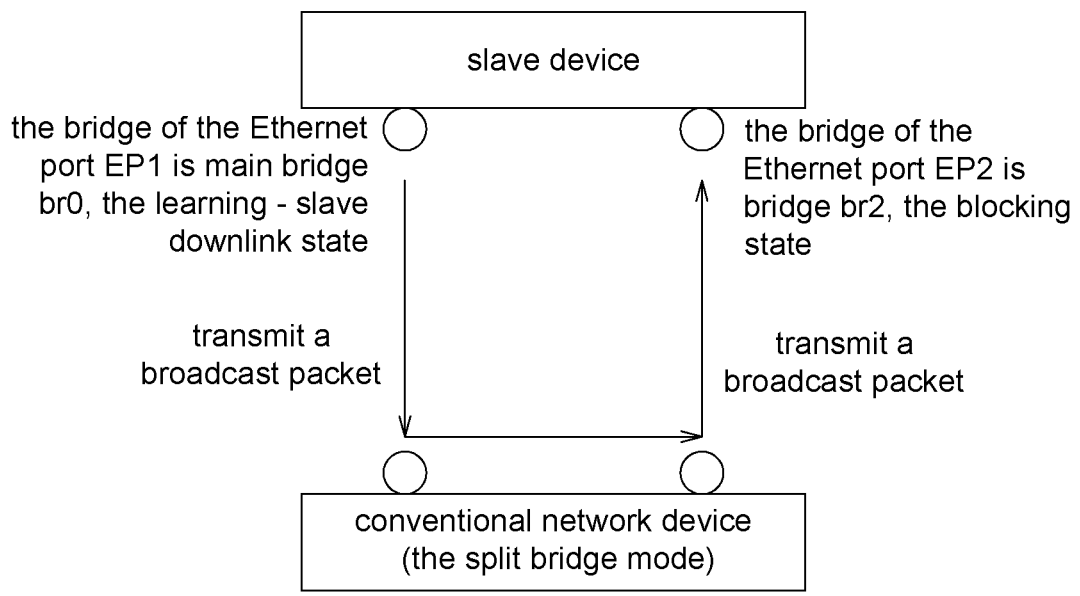
Figure 12A:
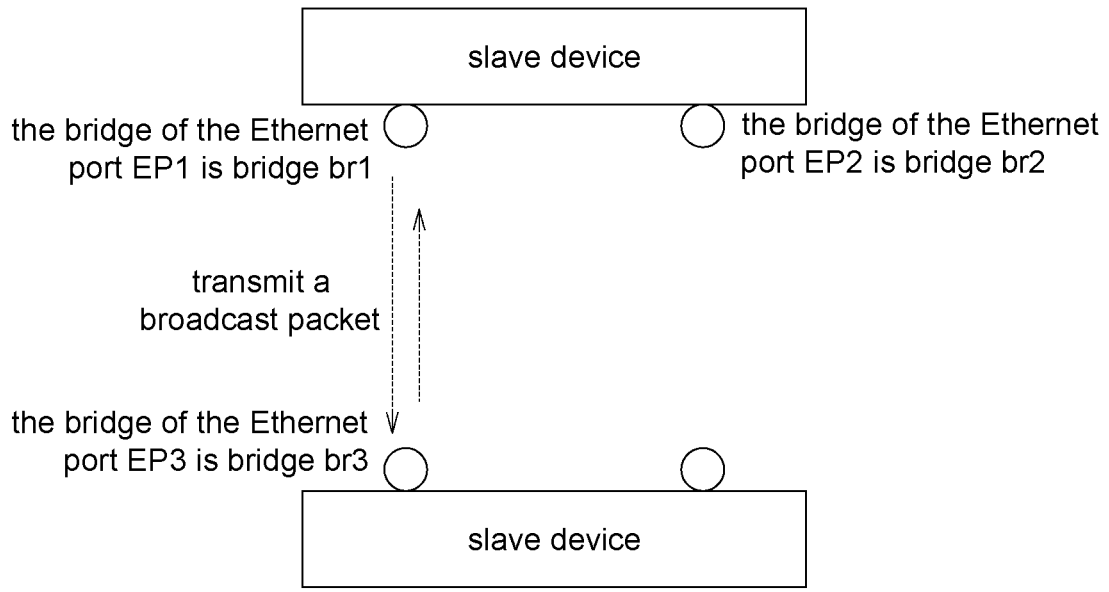
FIGS. 12A to 12C are schematic diagrams of scenario 3 of potential downlink loops of a network device.
Figure 12B:
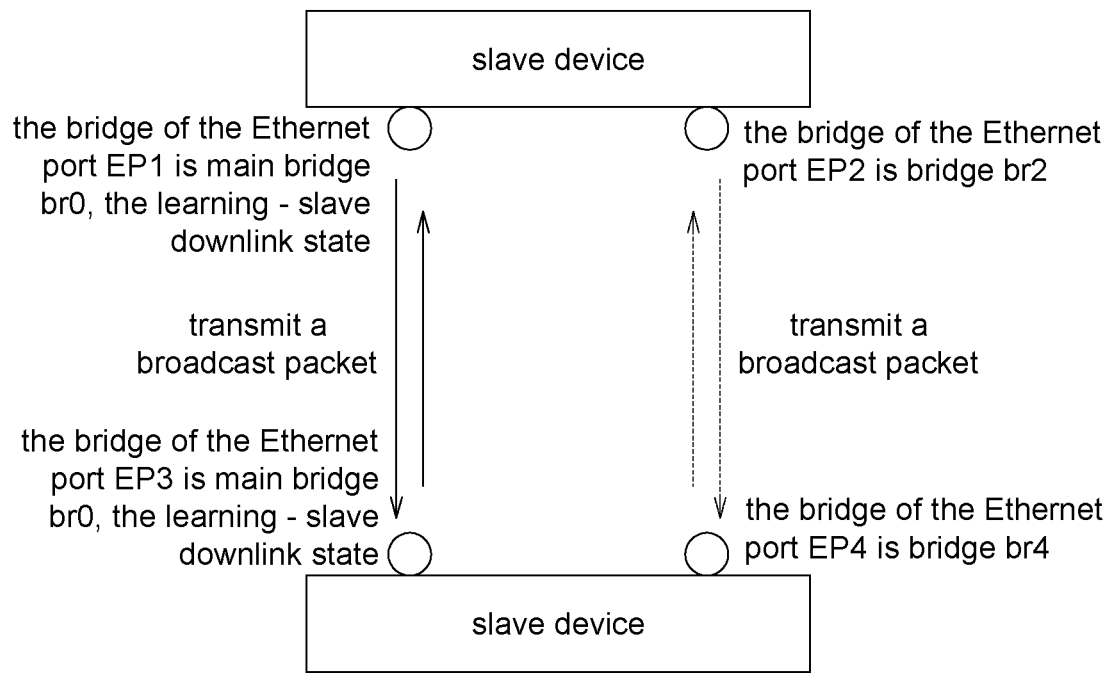
Figure 12C:
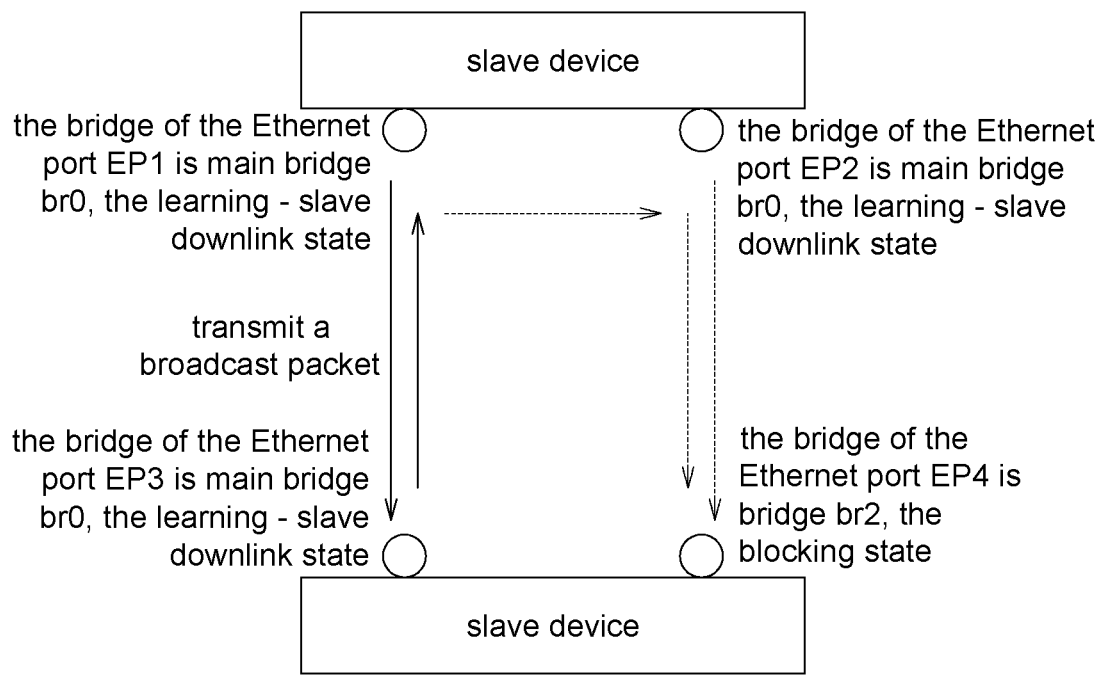

FIGS. 10 to 12 illustrate the scenarios of potential downlink loops. As indicated in FIG. 10A, the first Ethernet port EP1 and the second Ethernet port EP2 belong to the same network device, and after the two ports are connected to the network link, self-looping occurs. As indicated in FIGS. 11A to B and FIGS. 12A to B, the first Ethernet port EP1 and the second Ethernet port EP2 belong the first network device, and the third port EP3 and the fourth port EP4 belong to the second network device; after the four ports are connected to two network links, a loop is formed. After performing the steps 53 to 57 of FIG. 5 and comparing the Ethernet interface weight EIW, at least one port is set to the blocking state to interrupt the loop.

Figure 13A:
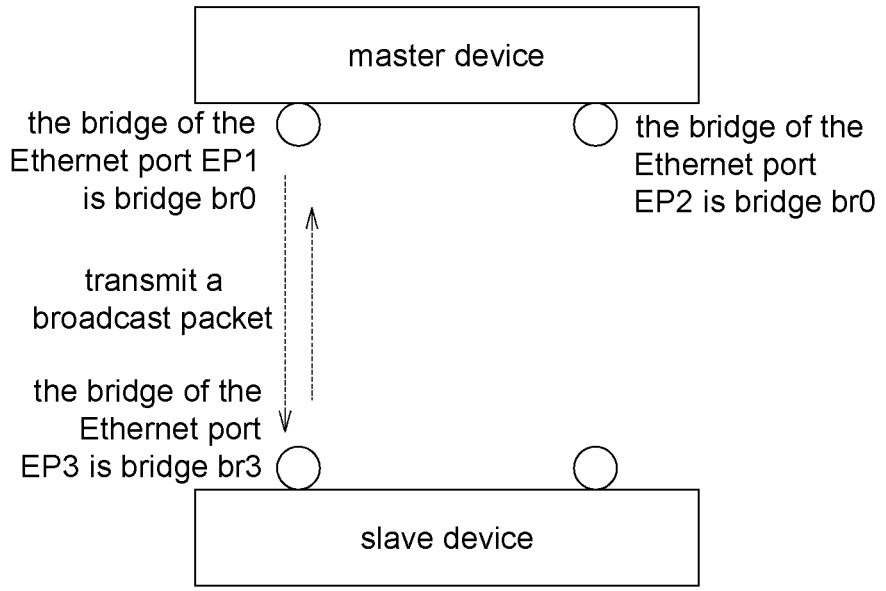
FIGS. 13A to 13D are schematic diagrams of scenario 1 of potential uplink loops of a network device.
Figure 13B:
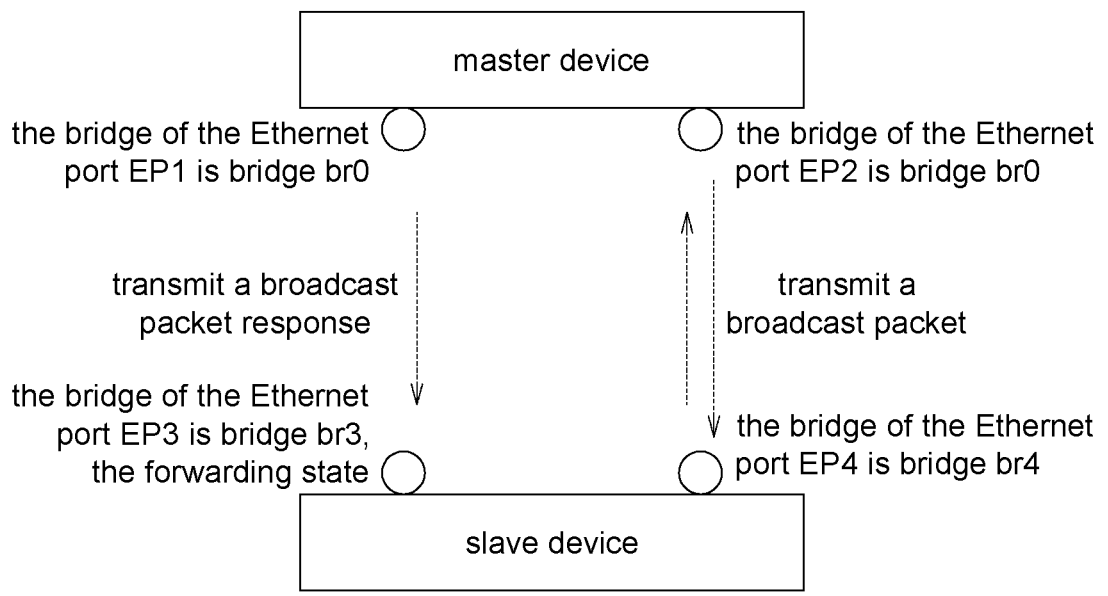
Figure 13C:
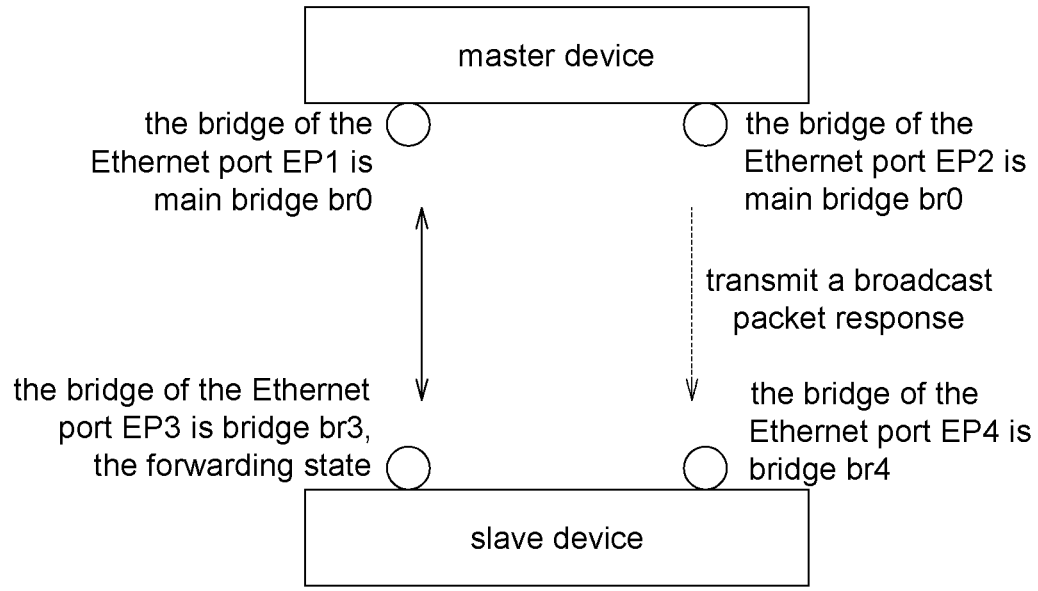
Figure 13D:
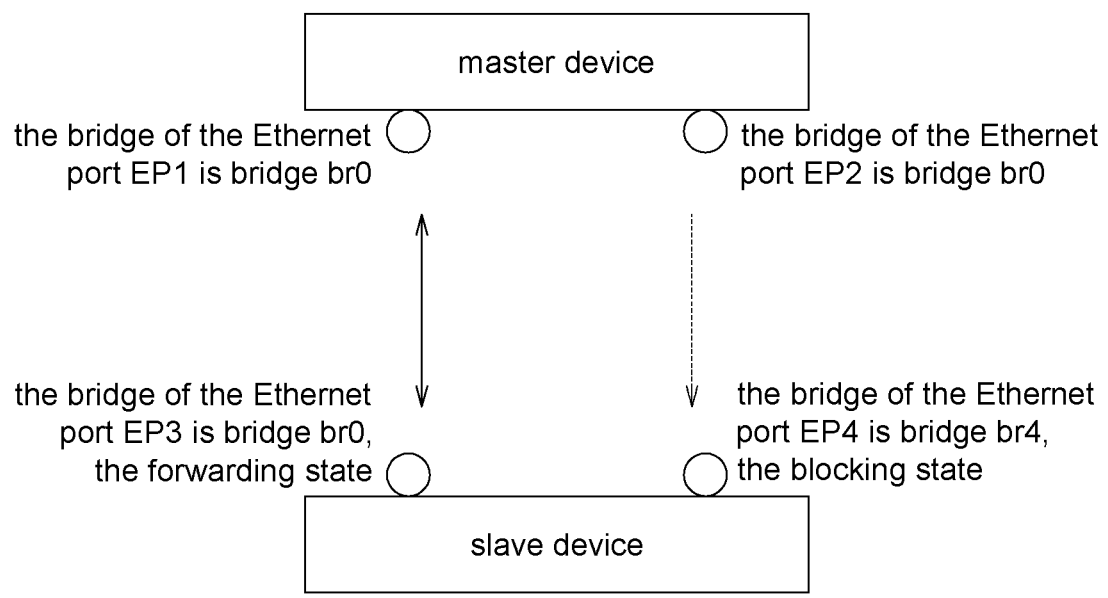

FIGS. 13A to 13D illustrate the scenarios of a potential uplink loop. As indicated in FIGS. 13A to 13B, after the first Ethernet port EP1 and the third port EP3 are firstly connected to the first network link and transmit a broadcast packet BP to each other, a first uplink path UPth is formed. However, in FIGS. 13B to 13C, after the second Ethernet port EP2 and the fourth port EP4 are connected to the second network link and transmit a broadcast packet BP and a broadcast packet response BPR to each other, a potential second uplink path UPth is formed. Thus, after performing the steps 85 to 88 of FIG. 8 and comparing the slave interface uplink weight SIUW of the fourth port EP4 with the slave interface uplink weight SIUW of the second Ethernet port EP2, if the comparison shows that the slave interface uplink weight SIUW of the fourth port EP4 is smaller (for example, the fourth port EP4 has the highest MAC address), the fourth port EP4 is set to the blocking state to interrupt the loop.

Figure 14A:
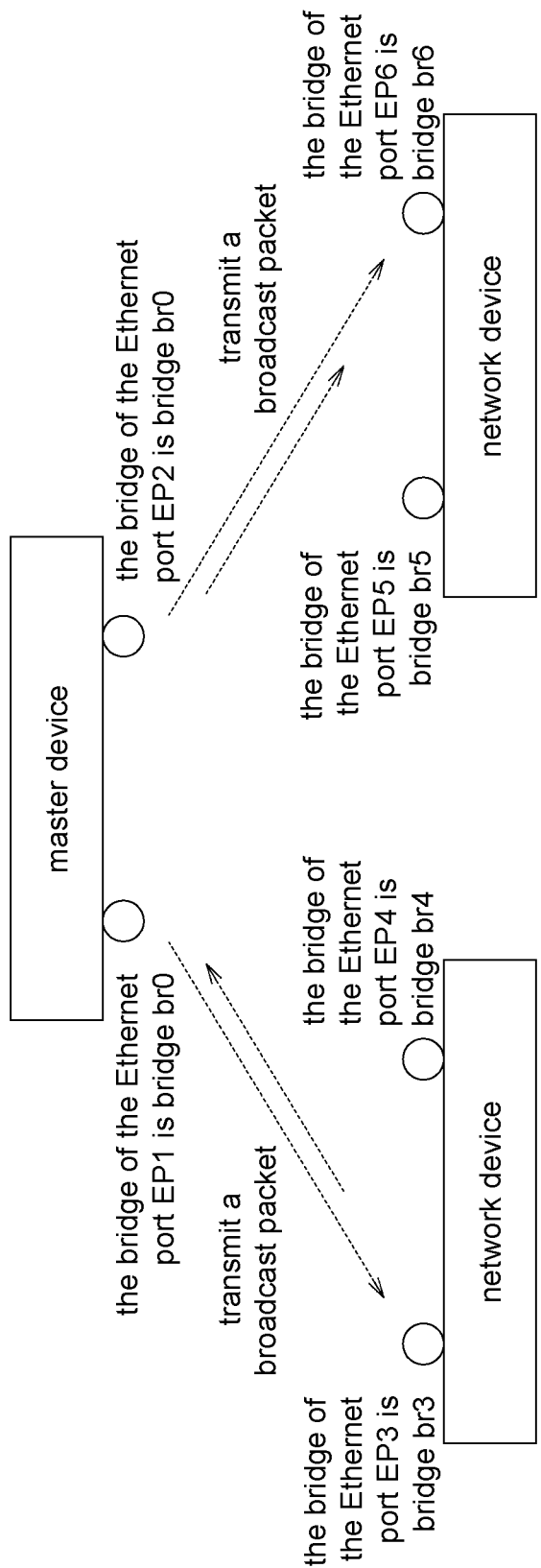
FIGS. 14A to 14C are schematic diagrams of scenario 2 of potential uplink loops of a network device.
Figure 14B:
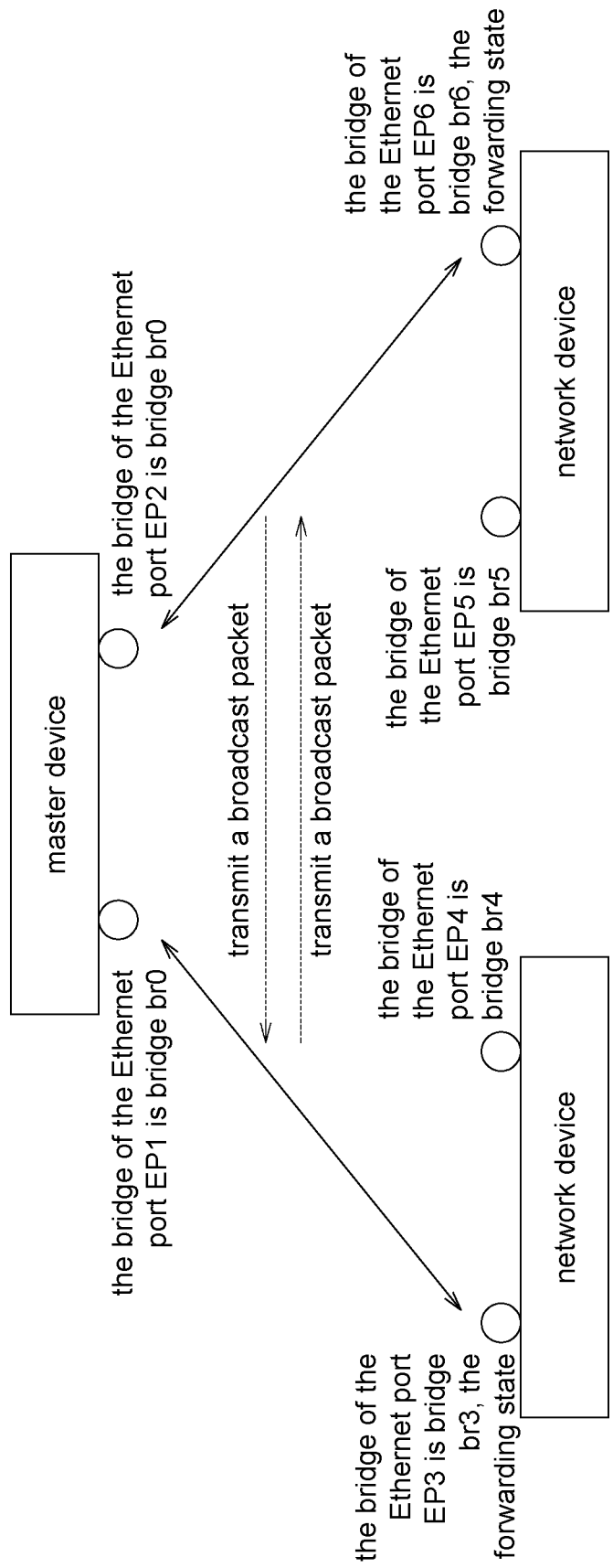
Figure 14C:
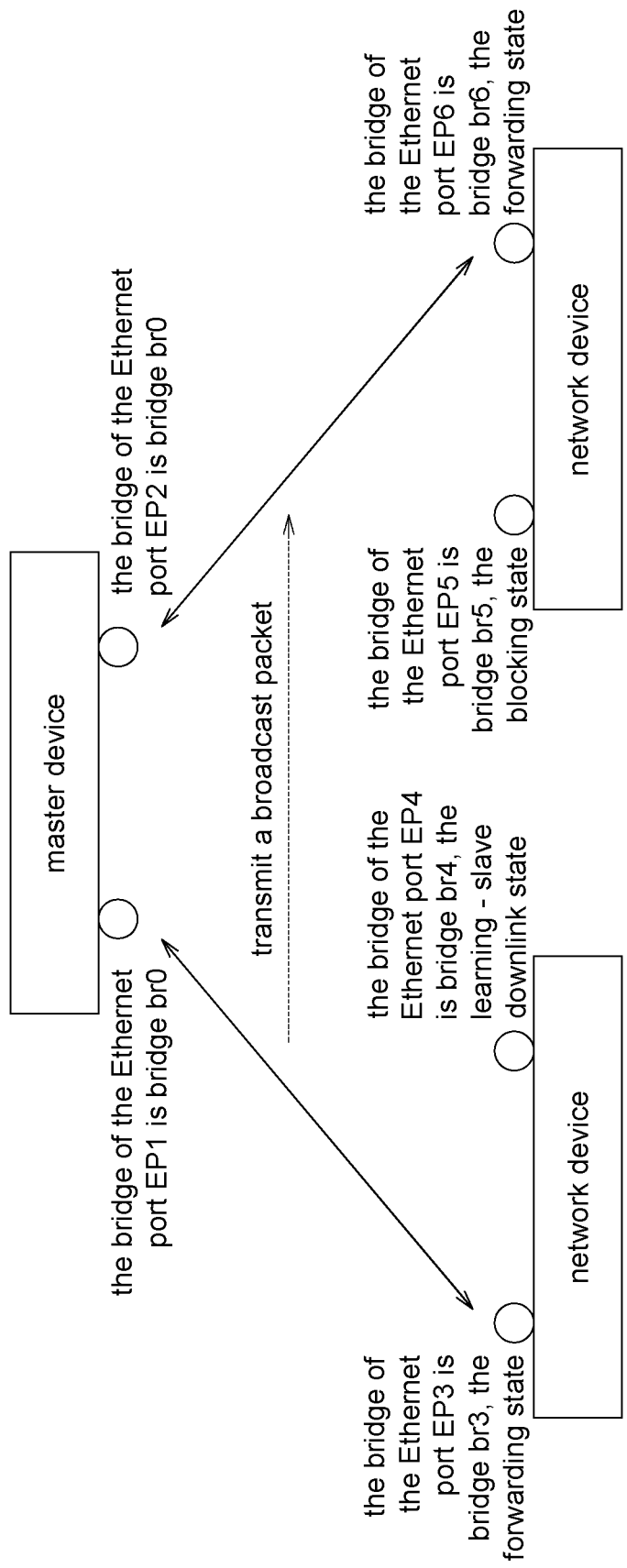

FIG. 14 illustrate the scenarios of another potential uplink loop. As indicated in FIG. 14A to 14B, after the first Ethernet port EP1 and the third port EP3 are connected to the first network link and transmit a broadcast packet BP to each other, a first uplink path UPth is formed. Meanwhile, after the second Ethernet port EP2 and the sixth port EP6 are connected to the second network link and transmit a broadcast packet BP to each other, a second uplink path UPth is also formed. However, in FIG. 14B to 14C, after the fourth port EP4 and the fifth port EP5 are connected to the third network link and transmit a broadcast packet BP to each other, the second network device may be provided with two uplink paths at the same time. Thus, after performing the steps 85 to 88 of FIG. 8 and comparing the slave interface uplink weight SIUW of the fourth port EP4 with the slave interface uplink weight SIUW of the fifth port EP5, if the comparison shows that the slave interface uplink weight SIUW of the fifth port EP5 is smaller (for example, the fifth port EP5 has the highest MAC address), the fifth port EP5 is set to the blocking state to interrupt the loop.

FIG. 15A to 15C illustrate potential scenarios of the MW comparison procedure performed in the steps 61, 63, 65, 67 of FIG. 6. As indicated in FIG. 15A, the first network device and the second network device originally are the only master device in two different local networks, respectively. When a network link is added to connect the Ethernet port EP1 of the first network device and the Ethernet port EP2 of the second network device, and step 61 is performed: the Ethernet port EP3 of the first network device and the Ethernet port EP4 of the second network device are in the split bridge mode and the disabled state; the Ethernet port EP1 of the first network device is in the split bridge mode, the bridge of the Ethernet port EP1 is the first bridge br1 and is in the learning state. Similarly, the Ethernet port EP2 of the second network device is in the split bridge mode, the bridge of the Ethernet port EP2 is the second bridge br2 and is in the learning state.

As indicated in FIG. 15C, if the second master weight MW #2 of the second network device is larger than the first master weight MW #1 of the first network device, and the first network device is enforced as a constant master device Master (that is, the first network device cannot be set as a slave device) by the user, after the steps 63 and 65 of FIG. 6 are performed, the state of each port is disclosed below. The bridges of the Ethernet port EP1 and the Ethernet port EP2 corresponding to the first network device and the second network device are set as the first bridge br1 and the main bridge br0, respectively; the first network device port EP1 is set to the blocking state, and the second network device port EP2 is set to the forwarding state. Thus, at the end, the first network device and the second network device are still the only master device in two different local networks, respectively.

On the other hand, as indicated in FIG. 15B, when the second master weight MW #2 of the second network device is larger than the first master weight MW #1 of the first network device, and the first network device is not enforced as a constant master device Master by the user, after the steps 63 and 67 of FIG. 6 are performed, the state of each is disclosed below. The first network device is set as a slave device, the second network device is set as a master device. That is, the second network device port EP2 is set as the main bridge mode, and the bridge of the Ethernet port EP2 is the main bridge br0 of the second network device and is in the forwarding state; the first network device port EP1 is set to the split bridge mode, the bridge of the Ethernet port EP1 is the first bridge br1 and is in the learning state, and transmits a broadcast packet to the second network device port EP2.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A first network device, comprising:
   a main bridge;
   a first bridge different from the main bridge;
   an Ethernet interface provided with a first Ethernet port whose bridge is selectively set as one of the main bridge and the first bridge, wherein the first network device has a split bridge mode in which a plurality of ports, including the first Ethernet port, independently use individual bridges, and one of the ports of the first network device with a highest MAC address in the split bridge mode is set to a blocking state to avoid a path loop which is a downlink loop, and one of a plurality of ports of a second network device, which has the split bridge mode, is set to a forwarding state to make the first network device and the second network device only master devices in two different local networks respectively; and
   a processing unit coupled to the Ethernet interface to perform the following steps in response to the first Ethernet port being connected to a mesh network:
     controlling the first Ethernet port to transmit a first broadcast packet carrying a first Ethernet interface weight (EIW);
     if a second broadcast packet is received within a predetermined period, parsing the second broadcast packet to extract a packet path information to determine whether the path loop exists;
     if it is determined that the path loop exists, determining, according to the first EIW and a second EIW carried by the second broadcast packet, whether the bridge of the first Ethernet port is set as the first bridge and whether the first Ethernet port needs to be set to the blocking state.

2. The first network device according to claim 1, wherein the packet path information contains a source address, and if the source address and a first Ethernet port address both belong to the first network device, it is determined that the path loop exists.

3. The first network device according to claim 1, wherein the first EIW is related to at least one of a user setting, a MAC address of the first Ethernet port, the MAC address of the first network device, and name of the first Ethernet port.

4. The first network device according to claim 1, wherein the first network device is selectively set as one of a master device role and a slave device role; if the first network device is set as the master device role, the first network device responds to a network address requesting broadcast packet originated from another network device; if the first network device is set as the slave device role, the first network device transmits the network address requesting broadcast packet to the other network device.

5. The first network device according to claim 4, wherein the processing unit further performs the following steps: if the first Ethernet port transmits the first broadcast packet, setting the bridge of the first Ethernet port as the first bridge, and setting the first network device as the master device role.

6. The first network device according to claim 4, wherein the processing unit further performs the following steps: if no broadcast packet is received within the predetermined period, setting the first network device as the master device role, setting the bridge of the first Ethernet port as the main bridge, and setting the first Ethernet port to the forwarding state.

7. The first network device according to claim 4, wherein the processing unit further performs the following steps: if parsing of the packet path information determines that no path loop exists, detecting whether the second network device transmitting the second broadcast packet is set as the master device role.

8. The first network device according to claim 7, wherein if the second network device is not set as the master device role, the bridge of the first Ethernet port is set as the main bridge, and the first Ethernet port is set to the forwarding state to transmit a broadcast packet response in response to the second broadcast packet.

9. The first network device according to claim 7, wherein the first broadcast packet further carries a first master weight (MW), and the second broadcast packet further carries a second MW; if the second network device is currently set as the master device role, whether the first network device needs to be set as the master device role is determined according to the first MW and the second MW.

10. A first network device:
    the first network device selectively set as one of a master device role and a slave device role, wherein if the first network device is set as the master device role, the first network device responds to a network address requesting broadcast packet originated from another network device; if the first network device is set as the slave device role, the first network device transmits the network address requesting broadcast packet to the other network device; and the first network device comprises:
    a main bridge;
    a first bridge different from the main bridge;
    an Ethernet interface provided with a first Ethernet port whose bridge is selectively set as one of the main bridge and the first bridge, wherein the first network device has a split bridge mode in which a plurality of ports, including the first Ethernet port, independently use individual bridges, and one of the ports of the first network device with a highest MAC address in the split bridge mode is set to a blocking state to avoid a path loop which is a downlink loop, and one of a plurality of ports of a second network device, which has a split bridge mode, is set to a forwarding state to make the first network device and the second network device only master devices in two different local networks respectively; and a processing unit coupled to the Ethernet interface to perform the following steps in response to the first Ethernet port being connected to a mesh network:

controlling the first Ethernet port to transmit a first broadcast packet carrying a first MW;

if a second broadcast packet is received within a predetermined period, determining, according to the first MW and a second MW carried by the second broadcast packet, whether the first network device needs to be set as the master device role.

11. The first network device according to claim 10, wherein if the first MW is larger than the second MW, the first network device is set as the master device role, the bridge of the first Ethernet port is set as the main bridge, and the first broadcast packet is re-transmitted.

12. The first network device according to claim 10, wherein if the second broadcast packet is received within the predetermined period, the processing unit further determines, according to the first MW and the second MW, whether the first Ethernet port needs to be set to the blocking state.

13. The first network device according to claim 12, wherein if the first MW is smaller than the second MW and the first network device is not allowed to be set as the slave device role, the first network device is set as the master device role, the bridge of the first Ethernet port is set as the first bridge, and the first Ethernet port is set to the blocking state.

14. The first network device according to claim 10, wherein if the first MW is smaller than the second MW and the first network device is allowed to be set as the slave device role, the first network device is set as the slave device role, the bridge of the first Ethernet port is set as the first bridge, and the first Ethernet port is set to a learning state.

15. The first network device according to claim 14, wherein the first Ethernet port is further set as a potential uplink path (potential UPth).

16. The first network device according to claim 10, wherein the first MW is related to at least one of (a) a user setting, (b) whether the first Ethernet port is capable of linking up to the Internet, (c) transmission speed to the Internet from the first Ethernet port, (d) the (media access control (MAC) address of the first Ethernet port.

17. A first network device:
the first network device selectively set as one of a master device role and a slave device role, wherein if the first network device is set as the master device role, the first network device responds to a network address requesting broadcast packet originated from another network device; if the first network device is set as the slave device role, the first network device transmits the network address requesting broadcast packet to the other network device; and the first network device comprises:

a main bridge;
a first bridge different from the main bridge;
an Ethernet interface provided with a first Ethernet port whose bridge is selectively set as one of the main bridge and the first bridge, wherein the first network device has a split bridge mode in which a plurality of ports, including the first Ethernet port, independently use individual bridges, and one of the ports of the first network device with a highest MAC address in the split bridge mode is set to a blocking state to avoid a path loop which is a downlink loop, and one of a plurality of ports of a second network device, which has a split bridge mode, is set to a forwarding state to make the first network device and the second network device only master devices in two different local networks respectively; and a processing unit coupled to the Ethernet transmission interface, wherein if the first network device is set as the slave device role and the bridge of the first Ethernet port is set as the first bridge, the processing unit performs the following steps:

controlling the first Ethernet port to transmit a first broadcast packet in response to a predetermined scenario that the first Ethernet port is connected to a mesh network;

if a first predetermined period matures but a second broadcast packet is not received, and a second predetermined period matures but a first broadcast packet response responding to the first broadcast packet is not received, setting the bridge of the first Ethernet port as the main bridge and re-transmitting the first broadcast packet.

18. The first network device according to claim 17, wherein the first broadcast packet carries a first Ethernet interface weight (EIW); if a second broadcast packet is received within the first predetermined period, the second broadcast packet is parsed to extract a packet path information to determine whether the path loop exists; if it is determined that the path loop exists, whether the bridge of the first Ethernet port is set as the first bridge and whether the first Ethernet port needs to be set to the blocking state is determined according to the first EIW and a second EIW carried by the second broadcast packet.

19. The first network device according to claim 17, wherein when the first predetermined period matures but the second broadcast packet is not received, and the first broadcast packet response is received within the second predetermined period, if the first network device does not have any other uplink path, the bridge of the first Ethernet port is set as the main bridge, and the first Ethernet port is set to the forwarding state.

20. The first network device according to claim 19, wherein when the first predetermined period matures but the second broadcast packet is not received, and the first broadcast packet response is received within the second predetermined period, whether the first Ethernet port needs to be set to a blocking state is determined according to the first SIUW and the second SIUW if the first network device is provided with a first uplink path through the first Ethernet port carrying a first SIUW, and the first network device is provided with a second uplink path through a second Ethernet port carrying a second SIUW.

21. The first network device according to claim 20, wherein the first SIUW is related to at least one of (a) a user setting, (b) network transmission speed from the first Ethernet port to a master device, (c) transmission speed of the network media connected to the first Ethernet port.

22. The first network device according to claim 20, wherein if the first SIUW is smaller than the second slave device uplink weight, the first Ethernet port is set to the blocking state, and a standby uplink path (standby UPth).

23. The first network device according to claim 22, the predetermined scenario further comprises setting the first Ethernet port as the standby uplink path.

24. The first network device according to claim 20, wherein if the first SIUW is larger than the second slave device uplink weight, firstly the second Ethernet port is set to the blocking state, then the bridge of the first Ethernet port is set as the main bridge, and lastly the first Ethernet port is set to the forwarding state.

25. The first network device according to claim 24, wherein the first network device further is provided with a wireless network port, which is activated by the first network device after the first network device is connected to a master device.

\* \* \* \* \*